US012249933B2

(12) United States Patent
Houda

(10) Patent No.: US 12,249,933 B2
(45) Date of Patent: Mar. 11, 2025

(54) MOTOR CONTROL DEVICE

(71) Applicant: ORIENTAL MOTOR CO., LTD., Tokyo (JP)

(72) Inventor: Akihiko Houda, Tsukuba (JP)

(73) Assignee: ORIENTAL MOTOR CO., LTD., Tokyo (JP)

(*) Notice: Subject to any disclaimer, the term of this patent is extended or adjusted under 35 U.S.C. 154(b) by 93 days.

(21) Appl. No.: 18/253,001

(22) PCT Filed: Nov. 9, 2021

(86) PCT No.: PCT/JP2021/041247
§ 371 (c)(1),
(2) Date: May 15, 2023

(87) PCT Pub. No.: WO2022/113732
PCT Pub. Date: Jun. 2, 2022

(65) Prior Publication Data
US 2023/0421082 A1 Dec. 28, 2023

(30) Foreign Application Priority Data
Nov. 27, 2020 (JP) ................................. 2020-196802

(51) Int. Cl.
H02P 21/24 (2016.01)
H02P 21/22 (2016.01)
H02P 27/08 (2006.01)

(52) U.S. Cl.
CPC ............. H02P 21/24 (2016.02); H02P 21/22 (2016.02); H02P 27/08 (2013.01)

(58) Field of Classification Search
CPC ........... H02P 21/24; H02P 21/22; H02P 27/08
(Continued)

(56) References Cited

U.S. PATENT DOCUMENTS 5,602,431 A * 2/1997 Satomi ................. H02K 41/031
310/68 B
7,579,804 B2 8/2009 Iotti
(Continued)

FOREIGN PATENT DOCUMENTS

EP 1786094 B1 2/2012
EP 2919378 A1 9/2015
(Continued)

OTHER PUBLICATIONS

J. B. Bartolo et al., "An Investigation on the Performance of Current Derivative Sensors for the Sensorless Control of A.C. Drives," 2008 4th IET Conference on Power Electronics, Machines and Drives, York, 2008, pp. 532-536, DOI: 10.1049/cp:20080578.
(Continued)

Primary Examiner — Kawing Chan
(74) Attorney, Agent, or Firm — Rabin & Berdo, P.C.

(57) ABSTRACT

A motor control device controls an AC motor by sensorless control. The motor control device includes: an inverter; a multilayer printed circuit board including an inner layer having a wiring pattern provided in a current line connecting the inverter to a winding of the AC motor; a plurality of chip inductors mounted on a major surface of the multilayer printed circuit board in opposed relation to the wiring pattern, and connected in series to form a series circuit having a midpoint connected to a reference potential; load resistors connected between the midpoint of the series circuit and the opposite ends of the series circuit; a differential amplification circuit connected to the series circuit; and a control unit that estimates the position of the rotor of the AC motor by using an output of the differential amplification circuit, and generates the pulse width modulation signal to be supplied to the inverter.

11 Claims, 15 Drawing Sheets

(58) Field of Classification Search
USPC .................................................. 318/400.02
See application file for complete search history.

(56) References Cited

U.S. PATENT DOCUMENTS

| | | | | |
|---|---|---|---|---|
| 2001/0015478 A1* | 8/2001 | Tsunoda | ................ | H02M 7/003 |
| | | | | 257/672 |
| 2004/0080293 A1* | 4/2004 | Kurosawa | ............... | H02P 6/182 |
| | | | | 318/400.11 |
| 2011/0199800 A1* | 8/2011 | Yahata | .................... | B60L 3/003 |
| | | | | 363/131 |
| 2011/0204831 A1 | 8/2011 | Iwaji et al. | | |
| 2012/0104886 A1* | 5/2012 | Yamasaki | ............ | B62D 5/0406 |
| | | | | 310/71 |
| 2013/0141871 A1* | 6/2013 | Omae | .................... | H02K 11/33 |
| | | | | 361/709 |
| 2018/0263108 A1* | 9/2018 | Tsukuda | ............... | H05K 1/0216 |
| 2018/0287466 A1 | 10/2018 | Kim et al. | | |
| 2018/0368262 A1* | 12/2018 | Motohashi | ............. | H02K 11/33 |
| 2020/0287492 A1 | 9/2020 | Sega | | |
| 2020/0406963 A1 | 12/2020 | Nakada et al. | | |

FOREIGN PATENT DOCUMENTS

| | | |
|---|---|---|
| JP | 2011-004515 A | 1/2011 |
| JP | 2011-176975 A | 9/2011 |
| JP | 2012-175747 A | 9/2012 |
| TW | 1276299 B | 3/2007 |
| TW | I472146 B | 2/2015 |
| TW | I519058 B | 1/2016 |
| WO | 2012/153794 A1 | 11/2012 |
| WO | 2014/128947 A1 | 8/2014 |
| WO | 2019/176316 A1 | 9/2019 |
| WO | 2019/239628 A1 | 12/2019 |

OTHER PUBLICATIONS

S. Bolognani et al., "Sensorless Control for IPMSM using PWM Excitation: Analytical Developments and Implementation Issues," 2011 Symposium on Sensorless Control for Electrical Drives, Birmingham, 2011, pp. 64-73, DOI: 10.1109/SLED.2011.6051546.

* cited by examiner (a) U-phase upper arm gate signal
(b) V-phase upper arm gate signal
(c) W-phase upper arm gate signal
(d) U-phase current
(e) U-phase current derivative detection voltage

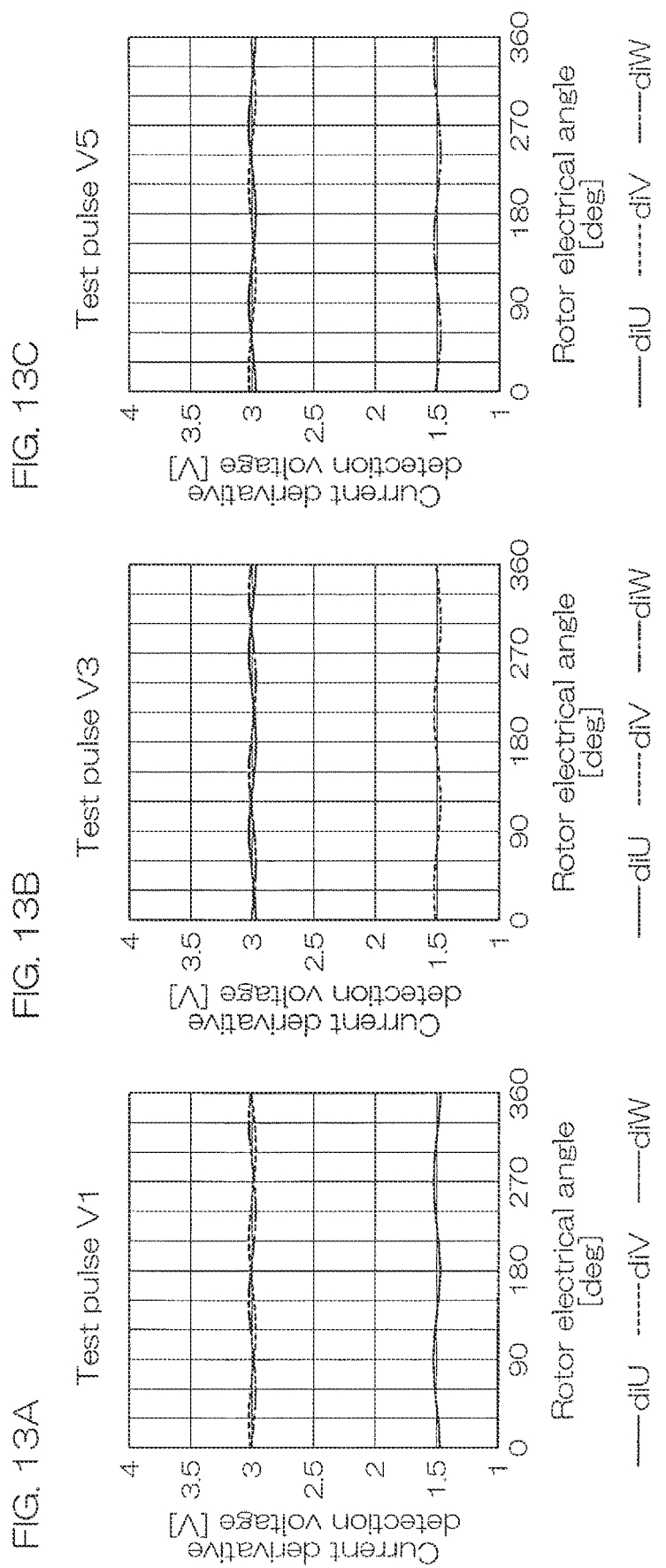

MOTOR CONTROL DEVICE

CROSS-REFERENCE TO RELATED APPLICATIONS

This application claims the benefit of priority to Japanese Patent Application No. 2020-196802, filed in the Japan Patent Office on Nov. 27, 2020, the disclosure of which is entirely incorporated herein by reference.

TECHNICAL FIELD

The present invention relates to a motor control device that controls an AC motor by sensorless control without the use of a rotor position detector.

BACKGROUND ART

AC motors are electric motors configured to operate while receiving AC supply, and examples thereof include brushless DC motors, induction motors, and stepping motors. That is, electric motors other than those configured to receive DC supply and change the direction of winding current with the use of a commutator are categorized as the AC motors.

A typical motor control device for such an AC motor includes an inverter that converts DC to AC, and the inverter supplies the AC to the electric motor. In order to properly control the inverter, rotor position information is required. Therefore, the inverter is controlled by utilizing the output of a rotor position detector that detects the rotational position of a rotor.

A known AC motor driving system is such that the AC motor is driven by estimating the rotor position without the use of the rotor position detector and controlling the inverter based on the estimated rotor position. This control system is referred to as "position sensorless control" or simply "sensorless control." Without the rotor position detector, there is no need to give consideration to the mounting position accuracy of the rotor position detector and the wiring routing of the rotor position detector and the like. In addition, the sensorless control can be advantageously applied to motors in which the rotor position detector cannot be provided for physical reasons and to motors in which the rotor position detector cannot be used for environmental reasons.

In a typical sensorless control process, the rotor position is estimated by an induced voltage method. In the induced voltage method, an induced voltage is calculated based on a motor model by using a voltage command and a current detection value, and the rotor position is estimated based on the induced voltage.

However, it is difficult to detect the rotor position when a motor rotation speed is in a lower speed range in which the induced voltage is small, due to a deviation of an actual application voltage from the voltage command, an error in the current detection, a limitation of the resolution of the current detection, and the like.

PTL 1 proposes a method of detecting a minute induced voltage when the motor is rotated at a lower rotation speed. This method utilizes the current derivative value of a winding current in a zero-voltage vector period during which no voltage is applied across the windings.

However, it is impossible to estimate the position based on the induced voltage when the rotation speed is in a very low speed range including a zero speed level. Methods disclosed in PTL 2, PTL 3, NPL 1 and NPL 2 can be used for the position estimation in the very low speed range. That is, the rotor position can be estimated by utilizing a phenomenon such that the winding inductance changes according to the rotor position due to saliency. The winding inductance can be determined based on the current derivative value when a known voltage is applied.

CITATION LIST

Patent Literature

PTL 1: WO2012/153794
PTL 2: WO2014/128947
PTL 3: JP2011-176975

Nonpatent Literature

NPL 1: J. B. Bartolo, C. S. Staines and C. Caruana, "An Investigation on the Performance of Current Derivative Sensors for the Sensorless Control of A.C. drives," 2008 4th IET Conference on Power Electronics, Machines and Drives, York, 2008, pp. 532-536, DOI: 10.1049/cp:20080578.

NPL 2: S. Bolognani, S. Calligaro, R. Petrella and M. Sterpellone, "Sensorless control for IPMSM using PWM excitation: Analytical developments and implementation issues," 2011 Symposium on Sensorless Control for Electrical Drives, Birmingham, 2011, pp. 64-73, DOI: 10.1109/SLED. 2011.6051546.

SUMMARY OF INVENTION

Problems to be Solved by Invention

In the sensorless control, the accuracy and the speed of the rotor position estimation significantly influence control characteristics. The accuracy and the speed of the current derivative detection to be used for the rotor position estimation are important factors that directly influence the control characteristics.

The current derivative detection method is roughly categorized into a method in which the current derivative is calculated from a current detection value as disclosed in PTL 1 and PTL 2, and a method in which a dedicated current derivative detector is used as disclosed in PTL 3, NPL 1 and NPL 2.

In PTL 1, a current value is sampled at least twice during a zero voltage period of a PWM sequence, and the current derivative value is computed by dividing a change in current value by a sampling time interval. This method requires a higher speed A/D conversion for the sampling to be performed a plurality of times in a short period. This results in cost increase.

In the method in which the current derivative value is determined by the sampling of the current value and the computation based on the current value, a shorter sampling time interval is liable to reduce the current change amount and, therefore, the current derivative value is liable to have a greater error because of the influence of the current detection error. If the sampling time interval is longer, on the other hand, it takes a longer period of time to obtain the current derivative value after the detection of the current value, thereby adversely influencing the control performance.

Since the two-time sampling is susceptible to noises, the sampling may be performed a greater number of times and subjected to filtering. However, this method requires the speed-up of the A/D conversion, and is liable to disadvantageously increase the detection period.

In PTL 1, the current derivative value is determined. However, the current derivative value thus determined is not used for the estimation of the rotor position, but for a vibration suppressing control. Therefore, the current derivative value does not require a higher accuracy. The current derivative value determined by the method disclosed in PTL 1 is not suitable for the estimation of the rotor position.

In PTL 2, a current detection signal is converted into a current derivative value by an analog circuit. Specifically, a device disclosed in PTL 2 includes a differential amplification circuit that receives a current detection signal inputted thereto and an integration circuit that integrates the output of the differential amplification circuit, and is configured to feed back the output of the integration circuit to the differential amplification circuit and input a differential amplification value based on the integral value and the current detection signal to the integration circuit. The differential amplification value, i.e., the input value of the integration circuit, corresponds to the current derivative value. Further, the output of the integration circuit serves as a current detection signal from which a high-frequency component attributable to a PWM signal for inverter control is filtered. In PTL 2, a commutation timing for a switched reluctance motor (SRM) having a higher saliency ratio and a greater inductance variation is determined by comparison between the current derivative value and a threshold.

In this method, the current derivative value can be acquired by single sampling. However, the integration circuit should be designed according to the PWM frequency and, hence, has its limitation in the responsiveness of the detection of the current derivative value. In addition, this method is adapted to acquire the current derivative value based on the current detection value and, therefore, is influenced directly by noises and the accuracy of the circuit. This poses a fundamental problem of difficulty in providing the current derivative value at a higher accuracy.

In general, the current detector is configured to detect the current by an analog sensor and, therefore, has an error of not less than 1% of a full scale. A current detector to be selected has a full scale range including a sufficient margin for a maximum current flowing through a motor winding. However, a current change corresponding to the current derivative value is small, and is only several percents of the full scale current of the current detector. For detection of a change in winding inductance, it is necessary to read out a change of several percents of the current derivative value. Therefore, it is intrinsically difficult to detect the current derivative value at a higher accuracy based on the output of the current detector including the analog sensor having an error of not less than 1% of the full scale. In consideration of the influence of the noises, it is more difficult to detect the current derivative value at a higher accuracy.

The method in which the current derivative value is determined based on the current detection value does not use the dedicated detector and, hence, is advantageous from the viewpoint of costs and space. From the viewpoint of the accuracy and the speed of the detection, however, it is more advantageous to use the dedicated current derivative detector.

In PTL 3, NPL 1 and NPL 2, there are descriptions about sensorless control utilizing dedicated current derivative detectors. These dedicated current derivative detectors are of different forms, but are each configured to be operative based on the current transformer principle so that a voltage according to a magnetic flux change due to a current flowing through a primary coil is detected at a secondary coil end. That is, the current derivative value at the primary coil can be detected directly at the secondary coil. The direct detection of the current derivative value can more easily provide a proper signal than the indirect detection of the current derivative value based on the current detection value.

A configuration such that a secondary coil is added to the core of a current detector utilizing a Hall sensor to share the core for the current detection and for the current derivative detection is shown in FIG. 2 of PTL 3.

In this configuration, however, the core magnetic flux is liable to change due to the influence of the current magnetic flux of the secondary coil. This may result in incorrect current detection. The current transformer is based on a detection principle such that a current flows through the secondary coil in such a direction as to cancel the primary coil magnetic flux and the secondary coil current is detected by the voltage drop of a load resistor connected to the coil end of the secondary coil. Although it may be possible to provide a proper output by properly designing the load resistance and the coils, it is difficult to satisfy the characteristic requirements for the two types of detectors with the single core.

Where the motor is driven with a higher voltage, the potential of the primary coil is increased. Therefore, an insulation distance corresponding to the voltage should be provided between the primary coil and the secondary coil in conformity with the safety standards. Since the coating of the magnet wire used for the winding is not regarded as an insulator according to the safety standards, the insulation should be ensured by some other means. This makes it difficult to reduce the size of the detector.

In NPL 1, the characteristics of a current derivative sensor having a toroidal coil structure which is most commonly used as the current derivative sensor for the sensorless control, and the characteristics of a current derivative sensor having a structure utilizing a coaxial cable as a winding are described. The toroidal coil has a feature such that only magnetic flux caused by a current following through a ring is detected without any influence of external magnetic flux. In a structure shown in FIG. 6 of NPL 1, only the secondary coil has a winding form, while the primary coil is provided as a single-turn coil with a current-flowing lead inserted through the ring.

Where a magnetic material is used for the core, a current differentiator based on the current transformer principle can more easily provide a higher output voltage, but is more likely to be influenced by the magnetic saturation of the magnetic material and the high-frequency characteristics. In addition, the current differentiator based on the current transformer is poorer in responsiveness than an air-core coil. In NPL 1, it is concluded that an air-core coaxial cable coil shown in FIG. 5 of NPL 1 is more excellent in responsiveness.

The coaxial cable coil is produced by winding a coaxial cable into a coil shape. One of the conductors of the coaxial cable is used for the power, and the other conductor is used for the detection. The conductor for the power should be thicker to allow for the flow of a large current. If a higher voltage is to be applied, a greater insulation distance is required between the conductors. Therefore, the coaxial cable itself is thick and, hence, cannot be wound in a multiplicity of turns. This makes it difficult to provide a greater output and to reduce the size.

In NPL 2, a current derivative sensor of an air-core toroidal structure called "Rogowski coil" is described. Without the use of the magnetic material for the core, the magnetic saturation does not occur, so that a highly responsive output can be provided. Even if the number of turns of the secondary coil is increased, the resulting output voltage is weak due to the air core. In order to reduce the labor of providing many turns around the ring-shaped core, the winding is first provided around a tubular object, and then the tubular object is formed into a ring shape with its opposite ends connected to each other (see FIG. 5 of NPL 2). In NPL 2, three Rogowski coils are used, and there are variations in the outputs of the respective Rogowski coils. Therefore, the characteristics of the Rogowski coils are adjusted uniformly with the use of a signal adjusting circuit.

Thus, the current derivative detector is hand-made for a research purpose, and there is no commercially available current derivative detector for industrial applications. The current derivative detector employing the magnetic core has problems of the magnetic saturation and the responsiveness. The air-core structure is free from the problem of the magnetic saturation and the responsiveness, but the secondary coil requires a multiplicity of turns of the winding. In particular, the production of the winding of the toroidal structure is not suitable for mechanization, requiring significant labor with the need for operator's manual operation. Problematically, this correspondingly increases the costs. In addition, variation-free production is difficult, requiring the uniform adjustment of the characteristics. Furthermore, the size reduction is difficult for a structural reason and, particularly for the higher voltage applications, the size increase is inevitable with the need for the insulation between the primary coil and the secondary coil.

In the present situation associated with the current derivative detectors, a practical motor driver has not yet been provided, which is capable of satisfactorily controlling the AC motor by the sensorless control even when the motor rotation speed is in the very low speed range.

An embodiment of the present invention provides a motor control device that can overcome the problems described above.

Solution to Problems

The embodiment of the present invention provides a motor control device that controls an AC motor by sensorless control without the use of a rotor position detector. The motor control device includes: an inverter that converts a direct current to an alternating current based on a pulse width modulation signal; a multilayer printed circuit board including an inner layer having a wiring pattern provided in a current line connecting the inverter to a winding of the AC motor; a plurality of chip inductors (preferably an even number of chip inductors) mounted on a major surface of the multilayer printed circuit board in opposed relation to the wiring pattern with their coil directions coinciding with a predetermined direction crossing the wiring pattern, and connected in series to form a series circuit having a midpoint connected to a reference potential; load resistors respectively connected between the midpoint of the series circuit and the opposite ends of the series circuit; a differential amplification circuit having a pair of input terminals respectively connected to the opposite ends of the series circuit; and a control unit that estimates the position of the rotor of the AC motor by using an output of the differential amplification circuit, and generates the pulse width modulation signal to be supplied to the inverter according to the estimated rotor position.

With this arrangement, the wiring pattern of the multilayer printed circuit board is provided in the current line connecting the inverter to the winding of the AC motor. The wiring pattern is formed in the inner layer of the multilayer printed circuit board and, therefore, is properly insulated from the major surface of the multilayer printed circuit board. The chip inductors are mounted on the major surface of the multilayer printed circuit board in opposed relation to the wiring pattern. The chip inductors are disposed with their coil directions coinciding with the predetermined direction crossing the wiring pattern. That is, the wiring pattern formed in the inner layer of the multilayer printed circuit board is opposed to the chip inductors mounted on the major surface of the multilayer printed circuit board and electrically insulated from the chip inductors by the insulator of the multilayer printed circuit board, and crosses the coil directions of the chip inductors. Therefore, magnetic flux generated by a current flowing through the wiring pattern interlinks with the coils of the chip inductors. When the current flowing through the wiring pattern changes and the magnetic flux correspondingly changes, the chip inductors each generate an electromotive force that prevents the change in the magnetic flux, and a voltage correspondingly occurs between the opposite electrodes of each of the chip inductors. The voltage can be regarded as a signal indicating a change in the current flowing through the wiring pattern with time, i.e., as a signal indicating a current derivative. Thus, the chip inductors function as a sensor that directly detects the current derivative. Therefore, a current derivative value can be detected without the need for a complicated time-consuming computation process.

The plurality of chip inductors are mounted on the major surface of the multilayer printed circuit board, and are connected in series. The midpoint of the resulting series circuit is connected to the reference potential, and the opposite ends of the series circuit are respectively connected to the pair of input terminals of the differential amplification circuit. The load resistors are respectively connected between the midpoint and the opposite ends of the series circuit. The electromotive forces generated by the chip inductors cause current flow in the load resistors, whereby a voltage drop occurs and signals corresponding to the voltage drop are inputted to the differential amplification circuit. With the midpoint of the series circuit connected to the reference potential, the potential of the midpoint is not changed even if the potential of the wiring pattern is significantly changed due to the switching in the inverter. This suppresses the influence of the switching, so that signals can be stably inputted to the differential amplification circuit.

The differential amplification circuit differentially amplifies the signals inputted to the pair of input terminals thereof, so that an in-phase component is removed from the signals inputted to the pair of input terminals, and only an out-of-phase component is amplified. Since a noise component is the in-phase component, the differential amplification circuit can amplify and output a noise-free signal component. Therefore, even if the current derivative signals to be outputted from the chip inductors are weak, the current derivative can be detected at a higher signal-to-noise ratio.

In this manner, the current supplied from the inverter to the AC motor can be detected directly (and therefore speedily) by the chip inductors, and the signal indicating the current derivative can be properly provided. Thus, the control unit can speedily and accurately estimate the rotor position of the AC motor, thereby accurately performing a motor control operation with a higher responsiveness.

Further, the chip inductors, which are industrially manufactured, have little variations in performance, so that the adjustment of the individual chip inductors is not required.

Since the chip inductors are smaller in size, the size of the structure for the detection of the current derivative can be advantageously reduced.

On the multilayer printed circuit board, for example, not only the chip inductors but also some or all of the load resistors, the differential amplification circuit, the inverter and the control unit can be mounted. Thus, the overall size reduction of the motor control device can be achieved. In other words, it is possible to provide the structure capable of directly and accurately detecting the current derivative value and hence capable of accurately performing the motor control operation with a higher responsiveness while suppressing or preventing the size increase of the motor control device.

In one embodiment of the present invention, the chip inductors are connected in series so that the electromotive forces are induced in the same direction in the respective chip inductors by a change in the magnetic flux generated by the current flowing through the wiring pattern. With this arrangement, the sum of the electromotive forces generated by the respective chip inductors can be amplified by the differential amplification circuit and, therefore, the signal indicating the current derivative can have a greater amplitude. Further, the current derivative value can be more accurately detected by averaging the characteristic variations of the individual chip inductors.

In one embodiment of the present invention, the chip inductors are provided in an even number. With this arrangement, the series circuit including the chip inductors can be easily configured symmetrically with respect to the midpoint, making it easier to balance the inputs to the pair of input terminals of the differential amplification circuit.

In one embodiment of the present invention, the control unit is configured to estimate the rotor position by regarding the output of the differential amplification circuit as a value corresponding to the time-differential value of the winding current of the AC motor (current derivative value). Once the time-differential value of the winding current (current derivative value) is obtained, the inductance of the winding of the AC motor can be determined, for example, based on the time-differential value. Since the winding inductance periodically changes according to the rotor position, the rotor position can be estimated based on the winding inductance.

In one embodiment of the present invention, the chip inductors are mounted in the same number on the two opposite major surfaces of the multilayer printed circuit board.

With the chip inductors mounted in the same number on one of the major surfaces and on the other major surface of the multilayer printed circuit board, the series circuit can be easily configured symmetrically with respect to the midpoint, thereby making it easier to balance the inputs to the pair of input terminals of the differential amplification circuit.

Further, the chip inductors can be dividedly mounted on the one major surface and on the other major surface of the multilayer printed circuit board to be thereby three-dimensionally disposed on the multilayer printed circuit board. This makes it possible to further reduce the size of the motor control device.

The magnetic flux generated by the current flowing through the wiring pattern is directed in opposite directions as observed on the one major surface and on the other major surface of the multilayer printed circuit board. On the other hand, magnetic flux externally generated, i.e., magnetic flux not attributable to the current flowing through the wiring pattern, is directed in the same direction and has the same magnitude on the one major surface and on the other major surface of the multilayer printed circuit board. As described above, the chip inductors are preferably connected in series so that the electromotive forces induced in the respective chip inductors by the change in the magnetic flux generated by the current flowing through the wiring pattern are directed in the same direction. In this case, a voltage occurring between the opposite ends of the series circuit of the chip inductors has a value such that the electromotive forces generated in the respective chip inductors according to the change in the current flowing through the wiring pattern are superposed together and the electromotive force attributable to the external magnetic flux is offset. This makes it possible to detect the current derivative while suppressing or preventing the influence of the external magnetic flux.

In one embodiment of the present invention, the chip inductors include a single chip inductor mounted on the one major surface of the multilayer printed circuit board and a single chip inductor mounted on the other major surface opposite from the one major surface.

In this case, the single chip inductor mounted on the one major surface and the single chip inductor mounted on the other major surface are preferably geometrically symmetric with respect to the wiring pattern through which the winding current flows. In other words, a preferred design is such that the wiring pattern through which the winding current flows is spaced the same distance from the single chip inductor mounted on the one major surface and from the single chip inductor mounted on the other major surface (where the wiring pattern includes a plurality of wiring patterns, the distance is defined as the sum of distances between the single chip inductor and the wiring patterns, and the same definition applies to the following description). This makes it easier to balance the inputs to the pair of input terminals of the differential amplification circuit.

In one embodiment of the present invention, the chip inductors include two chip inductors mounted on the one major surface of the multilayer printed circuit board, and two chip inductors mounted on the other major surface opposite from the one major surface.

In this case, a total of four chip inductors are preferably connected in series so that one of the chip inductors on the one major surface of the multilayer printed circuit board and one of the chip inductors on the other major surface are connected in series to be arranged (connected) on one of opposite sides of the midpoint and the other two chip inductors are connected in series to be arranged (connected) on the other side of the midpoint. Thus, the geometrical arrangements of the chip inductors with respect to the wiring pattern through which the winding current flows (more specifically, the distances from the wiring pattern to the chip inductors) on the opposite sides of the midpoint of the series circuit are equivalent to each other (symmetrical). This connection configuration (arrangement) is particularly effective where the geometrical arrangement of the chip inductors mounted on the one major surface and the geometrical arrangement of the chip inductors mounted on the other major surface (more specifically, the distances from the wiring pattern to the chip inductors) with respect to the wiring pattern are not equivalent to each other (symmetrical).

In one embodiment of the present invention, the chip inductors are air-core coils, and are not shielded. The use of the chip inductors of the air-core coil type makes it possible to detect the current derivative without the influence of the magnetic saturation. Further, the use of the chip inductors of the unshielded structure makes it possible to detect the magnetic flux generated by the current flowing through the wiring pattern at a higher sensitivity.

In one embodiment of the present invention, the chip inductors have the same specifications. The use of the chip inductors of the same specifications makes it easier to configure the series circuit symmetrically with respect to the midpoint. Chip inductors industrially manufactured as having the same specifications are uniform in performance and, therefore, can be used substantially without the need for the adjustment.

Effect of Invention

The present invention makes it possible to speedily and accurately detect the current derivative of the winding current, specifically to achieve the detection of the current derivative with a smaller structure. Thus, the motor control device according to the present invention is smaller in size, and yet achieves highly responsive motor control.

BRIEF DESCRIPTION OF DRAWINGS

FIGS. 13A, 13B and 13C show current derivative detection voltages obtained by applying test pulses at different rotor electrical angles while detecting the rotor electrical angles by means of an encoder.

DESCRIPTION OF EMBODIMENTS

Embodiments of the present invention will hereinafter be described in detail with reference to the attached drawings.

Figure 1A:
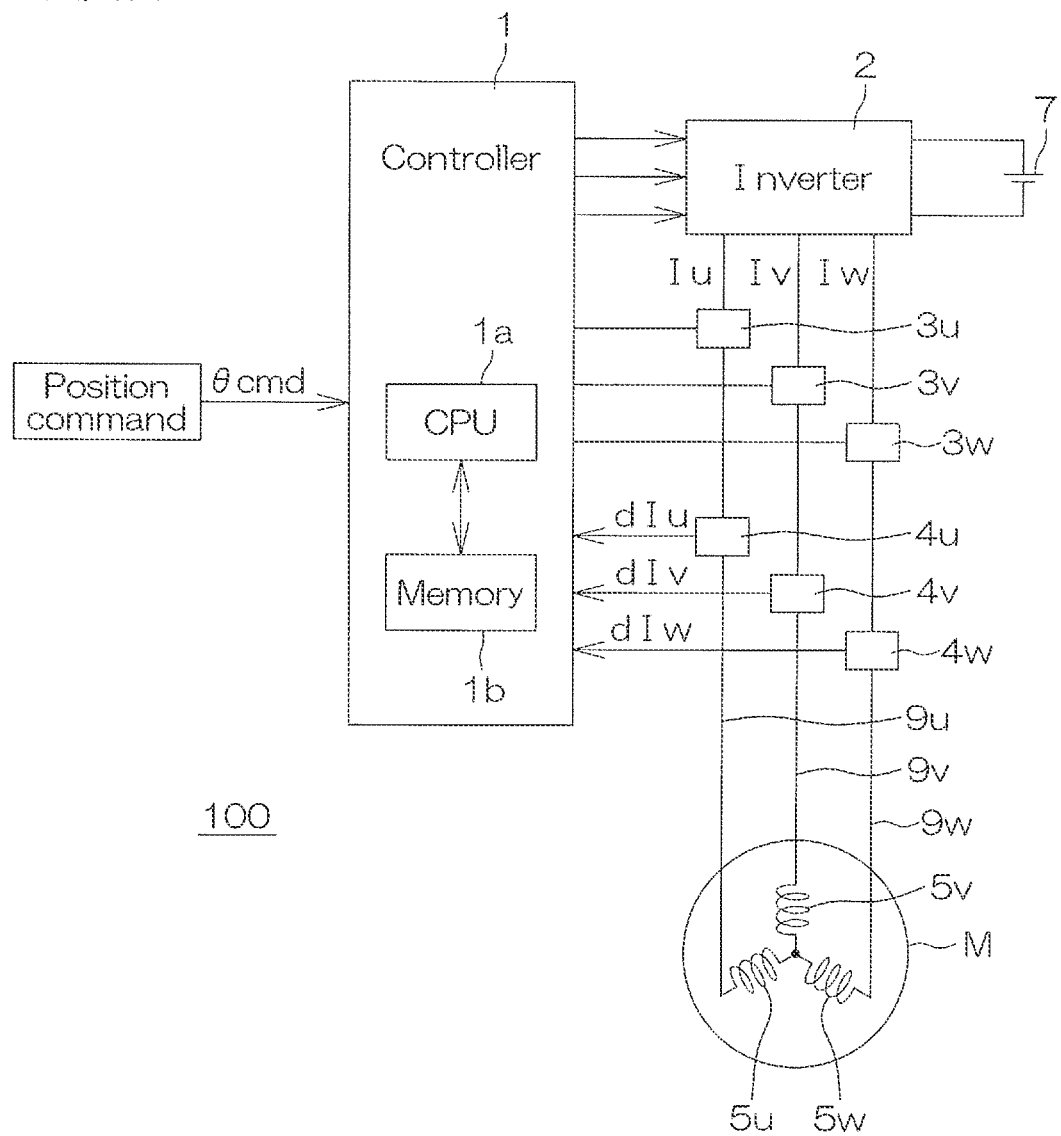
FIG. 1A is a block diagram for describing the configuration of a motor control device according to an embodiment of the present invention.

FIG. 1A is a block diagram for describing the configuration of a motor control device according to one embodiment of the present invention. The motor control device 100 is a device adapted to drive an AC motor M. More specifically, the motor control device 100 drives the AC motor M by so-called sensorless control, i.e., by controlling the AC motor M without the use of a rotor position detector for the detection of the position of the rotor of the AC motor M. The AC motor M may be a surface magnet synchronous motor (SPMSM). The AC motor M is, for example, a three-phase AC motor, and has a U-phase winding $5u$, a V-phase winding $5v$ and a W-phase winding $5w$. Hereinafter, these windings are often referred to generally as "winding(s) $5uvw$."

In this example, the motor control device 100 has a feedback system including a position control loop, a speed control loop and a current control loop, and is configured so as to perform a position servo control operation to control the rotor position of the AC motor M according to a position command. Vector control is employed for the current control.

The rotor position is estimated by a position estimator with the use of signals obtained by current derivative detectors without the use of the rotor position detector. More specifically, the inductances of the respective phase windings of the AC motor M are estimated based on current derivative values, and the rotor position is estimated based on the inductances. In principle, the surface magnet synchronous motor is free from saliency and, therefore, it is considered that magnetic poles cannot be detected based on changes in inductances. Where magnets such as neodymium magnets having strong magnetic forces are used, however, the inductances are slightly changed by the magnetic saturation of iron cores.

Specifically, the motor control device 100 includes a controller 1 as the control unit, an inverter 2, current detectors $3u$, $3v$, $3w$, and current derivative detectors $4u$, $4v$, $4w$. The inverter 2 converts a direct current supplied from a DC power source 7 into an alternating current, and supplies the alternating current to the windings $5uvw$ of the AC motor M. The inverter 2 and the AC motor M are connected to each other via three current lines $9u$, $9v$, $9w$ (hereinafter often referred to generally as "current line(s) $9uvw$") for the U-phase, the V-phase and the W-phase. The current detectors $3u$, $3v$, $3w$ and the current derivative detectors $4u$, $4v$, $4w$ are provided in the current lines $9uvw$, respectively.

The current detectors $3u$, $3v$, $3w$ (hereinafter often referred to generally as "current detector(s) $3uvw$") detect phase currents flowing through the corresponding phase current lines $9uvw$, i.e., a U-phase current Iu, a V-phase current Iv and a W-phase current Iw (hereinafter often referred to generally as "phase current(s) Iuvw"), respectively. The current derivative detectors $4u$, $4v$, $4w$ (hereinafter often referred to generally as "current derivative detector(s) $4uvw$") detect changes in the phase currents flowing through the corresponding phase current lines $9uvw$ with time, i.e., U-phase, V-phase and W-phase current derivative values dIu, dIv, dIw (hereinafter often referred to generally as "current derivative value(s) dIuvw"), respectively.

The controller 1 controls the inverter 2 based on a position command θcmd. The controller 1 is provided in the form of a computer, and includes a processor (CPU) 1a, and a memory 1b as a recording medium that records a program to be executed by the processor 1a.

Figure 1B:
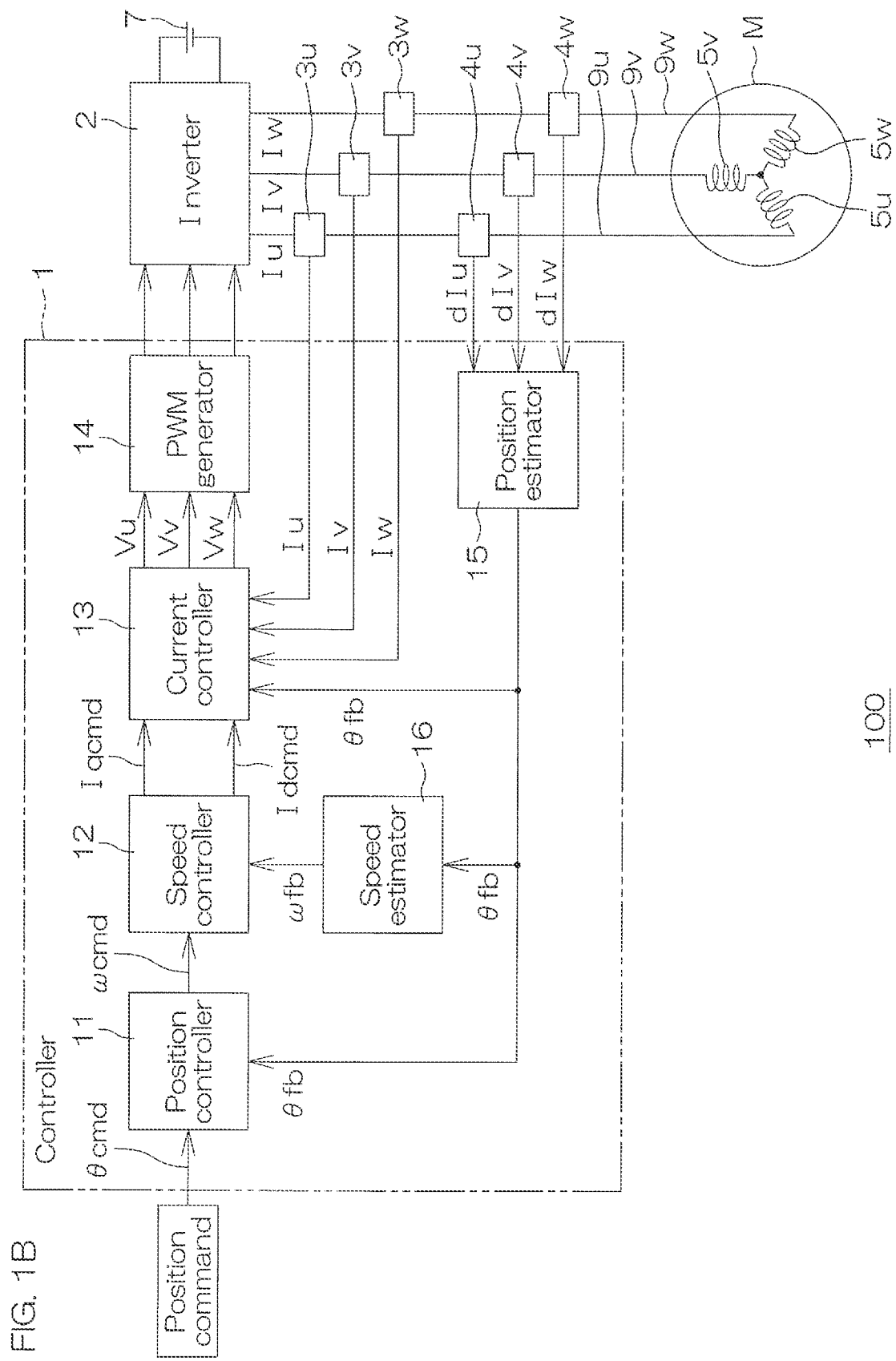
FIG. 1B is a block diagram for describing the functional configuration of a controller provided in the motor control device.

FIG. 1B is a block diagram for describing the functional configuration of the controller 1. The controller 1 is configured so that the processor 1a executes the program to perform the functions of a plurality of functional processing portions. The functional processing portions include a position controller 11, a speed controller 12, a current controller 13, a PWM generator 14, a position estimator 15, and a speed estimator 16.

The position estimator 15 performs a rotor position estimating computation to estimate the rotor position of the AC motor M by using signals outputted by the current derivative detectors 4*uvw*, i.e., the current derivative values dIuvw, and feeds back the estimated position θfb to the position controller 11. The position controller 11 generates a speed command ωcmd based on the estimated position θfb so as to match the rotor position with the position command θcmd, and supplies the speed command ωcmd to the speed controller 12. In this manner, the position control loop is provided.

The estimated position θfb of the rotor is also supplied to the speed estimator 16. The speed estimator 16 performs a rotor speed estimating computation to determine a change in the estimated position θfb with time to estimate the speed of the rotor, and supplies the estimated speed ωfb to the speed controller 12. The speed controller 12 generates current commands Idcmd, Iqcmd based on the estimated speed ωfb so as to match the rotor speed with the speed command ωcmd, and supplies the current commands Idcmd, Iqcmd to the current controller 13. In this manner, the speed control loop is provided.

The phase currents Iuvw detected by the current detectors 3*uvw* (precisely, the detection values of the phase currents Iuvw) are supplied to the current controller 13. The current controller 13 generates a U-phase voltage command Vu, a V-phase voltage command Vv and a W-phase voltage command Vw (hereinafter often referred to generally as "voltage command(s) Vuvw") so as to match the phase currents Iuvw with the current commands Idcmd, Iqcmd, and supplies the voltage commands Vuvw to the PWM generator 14. In this manner, the current control loop is provided.

The PWM generator 14 generates PWM control signals (pulse width modulation signals) according to the voltage commands Vuvw, and supplies the PWM control signals to the inverter 2. Thus, voltages according to the voltage commands Vuvw are applied across the windings 5*uvw* of the AC motor M via the current lines 9*uvw*.

Figure 2:
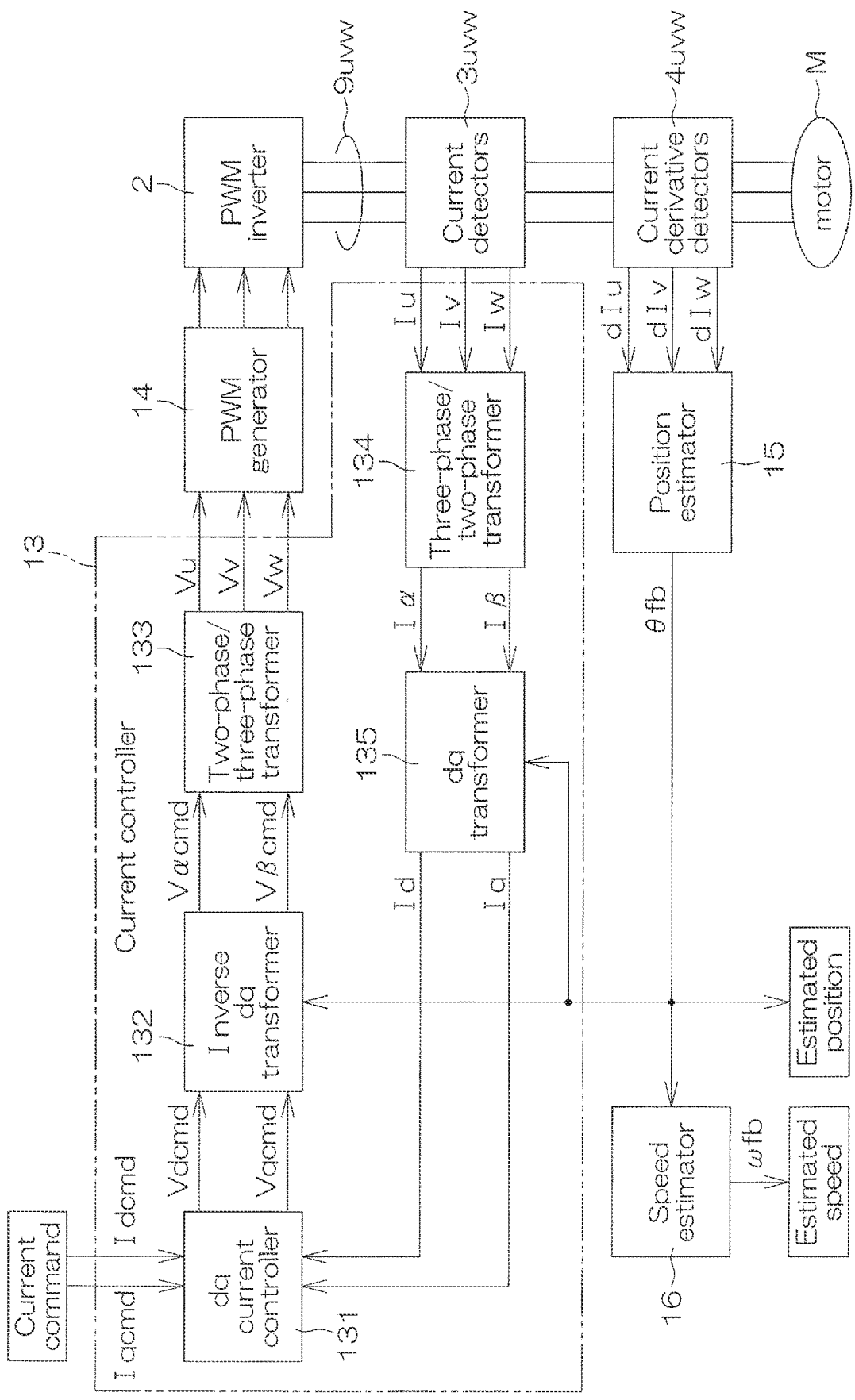
FIG. 2 is a block diagram showing a specific example of a detailed configuration associated with a current controller.

FIG. 2 is a block diagram showing a specific example of a detailed configuration associated with the current controller 13. The speed controller 12 generates a d-axis current command Idcmd and a q-axis current command Iqcmd on a dq rotational coordinate system, and supplies the d-axis current command Idcmd and the q-axis current command Iqcmd to the current controller 13. The dq rotational coordinate system is a rotational coordinate system defined by a d-axis extending in the magnetic flux direction of the rotor of the AC motor M and a q-axis orthogonal to the d-axis, and rotated according to the rotation angle (electrical angle) of the rotor. The current controller 13 includes a dq current controller 131, an inverse dq transformer 132, a two-phase/three-phase transformer 133, a three-phase/two-phase transformer 134, and a dq transformer 135. three-phase/two-phase transformer 134 transforms the three phase currents Iuvw detected by the current detectors 3*uvw* into two phase current values Iα, Iβ on an αβ coordinate system which is a two-phase fixed coordinate system. The dq transformer 135 transforms the two phase current values Iα, Iβ on the αβ coordinate system into a d-axis current value Id and a q-axis current value Iq on the dq rotational coordinate system. The current values Id, Iq on the dq rotational coordinate system are supplied to the dq current controller 131. The dq current controller 131 generates a d-axis voltage command Vdcmd and a q-axis voltage command Vqcmd (which are voltage commands on the dq rotational coordinate system) so as to match the d-axis current value Id and the q-axis current value Iq with the d-axis current command Idcmd and the q-axis current command Iqcmd, respectively. The voltage commands Vdcmd, Vqcmd are transformed into voltage commands Vαcmd, Vβcmd on the αβ, coordinate system by the inverse dq transformer 132. Further, the voltage commands Vαcmd, Vβcmd on the αβ, coordinate system are coordinate-transformed into the three phase voltage commands Vuvw by the two-phase/three-phase transformer 133. The three phase voltage commands Vuvw are supplied to the PWM generator 14.

The position estimator 15 computes the rotor angle on the αβ, coordinate system, and supplies the rotor angle as the estimated position θfb to the inverse dq transformer 132 and the dq transformer 135. The estimated position θfb is used for the computation for the coordinate transformation between the dq rotational coordinate system and the αβ, coordinate system and for the computation for the speed estimation by the speed estimator 16.

Figure 3:
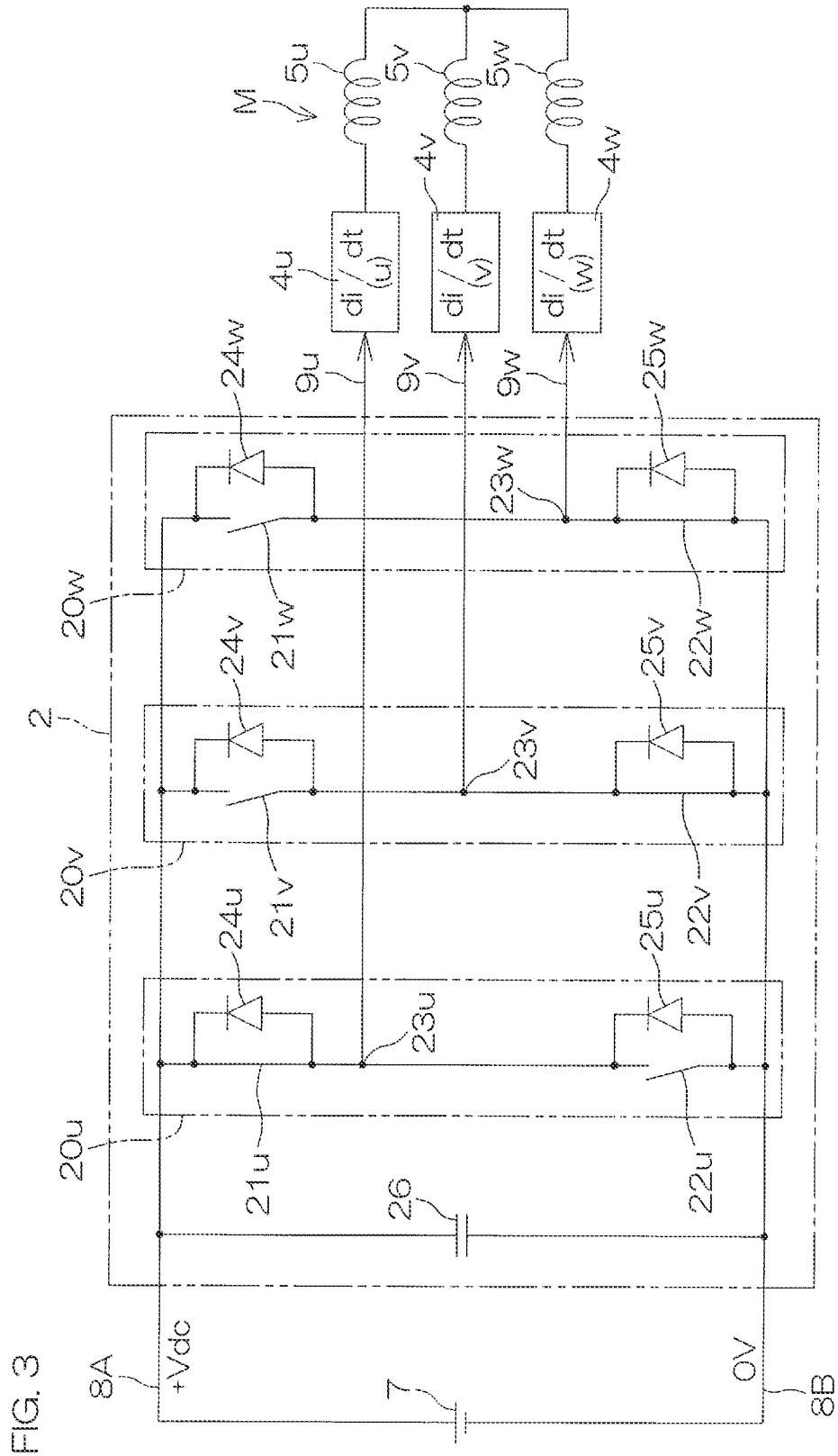
FIG. 3 is an electric circuit diagram for describing the configuration of an inverter by way of example.

FIG. 3 is an electric circuit diagram for describing the configuration of the inverter 2 by way of example. Bridge circuits 20*u*, 20*v*, 20*w* for the three phases are connected in parallel between a pair of power supply lines 8A and 8B connected to the DC power source 7. A capacitor 26 for smoothing is further connected between the pair of power supply lines 8A and 8B.

The bridge circuits 20*u*, 20*v*, 20*w* (hereinafter often referred to generally as "bridge circuit(s) 20*uvw*") are respectively constituted by series circuits each including an upper arm switching device 21*u*, 21*v*, 21*w* (hereinafter often referred to generally as "upper arm switching device(s) 21*uvw*") and a lower arm switching device 22*u*, 22*v*, 22*w* (hereinafter often referred to generally as "lower arm switching device(s) 22*uvw*") connected in series. In the bridge circuits 20*uvw*, the current lines 9*uvw* for connection to the corresponding windings 5*uvw* of the AC motor M are respectively connected to midpoints 23*u*, 23*v*, 23*w* between the upper arm switching devices 21*uvw* and the lower arm switching devices 22*uvw*.

The switching devices 21*uvw*, 22*uvw* are typically power MOS transistors, and respectively incorporate parasitic diodes 24*u*, 24*v*, 24*w*; 25*u*, 25*v*, 25*w* each connected in a direction opposite to that of the DC power source 7.

The current derivative detectors 4*uvw* are configured so as to detect the current derivative values dIuvw which are the time-differential values of the phase currents Iuvw flowing through the respective phase current lines 9*uvw*.

The PWM control signals supplied from the controller 1 are inputted to the gates of the switching devices 21*uvw*, 22*uvw*, whereby the switching devices 21*uvw*, 22*uvw* are turned on and off. The bridge circuits 20*uvw* are each controlled so that, when one of the upper arm switching device 21*uvw* and the lower arm switching device 22*uvw* thereof provided in pair is on, the other is off. The value of the PWM control signal is defined as "1" for a control state such that the upper arm switching device 21*uvw* is on and the lower arm switching device 22*uvw* is off, and the value of the PWM control signal is defined as "0" for a control state such that the upper arm switching device 21*uvw* is off and the lower arm switching device 22*uvw* is on. Then, the PWM control signals can describe any of 8 patterns (states) each expressed by a three-dimensional vector. The eight patterns (states) are expressed by (1,0,0), (1,1,0), (0,1,0), (0,1,1), (0,0,1), (1,0,1), (0,0,0) and (1,1,1). Of these, the first six patterns (1,0,0), (1,1,0), (0,1,0), (0,1,1), (0,0,1) and (1,0,1) correspond to states in which a voltage is applied across the windings 5uvw of the AC motor M. The other two patterns (0,0,0) and (1,1,1) correspond to states in which no voltage is applied across the windings 5uvw.

Figure 4:
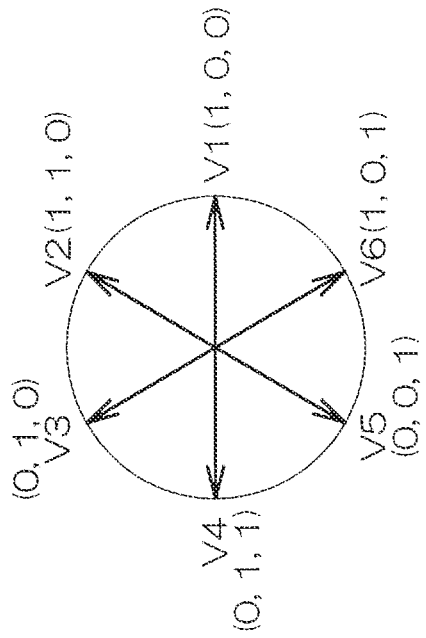
FIGS. 4A and 4B show voltage vectors corresponding to eight states of the inverter.

FIG. 4A shows voltage vectors V0 to V7 corresponding to the eight patterns (states) described above. The voltage vectors V1(1,0,0), V2(1,1,0), V3(0,1,0), V4(0,1,1), V5(0,0,1) and V6(1,0,1) corresponding to the six patterns for which the voltage is applied across the windings can be expressed by six voltage vectors that divide an electrical angle range of 360 degrees into six equiangular ranges as shown in FIG. 4B. The voltage vectors V0 (0,0,0) and V7 (1,1,1) are zero-voltage vectors for which no voltage is applied across the windings 5uvw.

Figure 5:
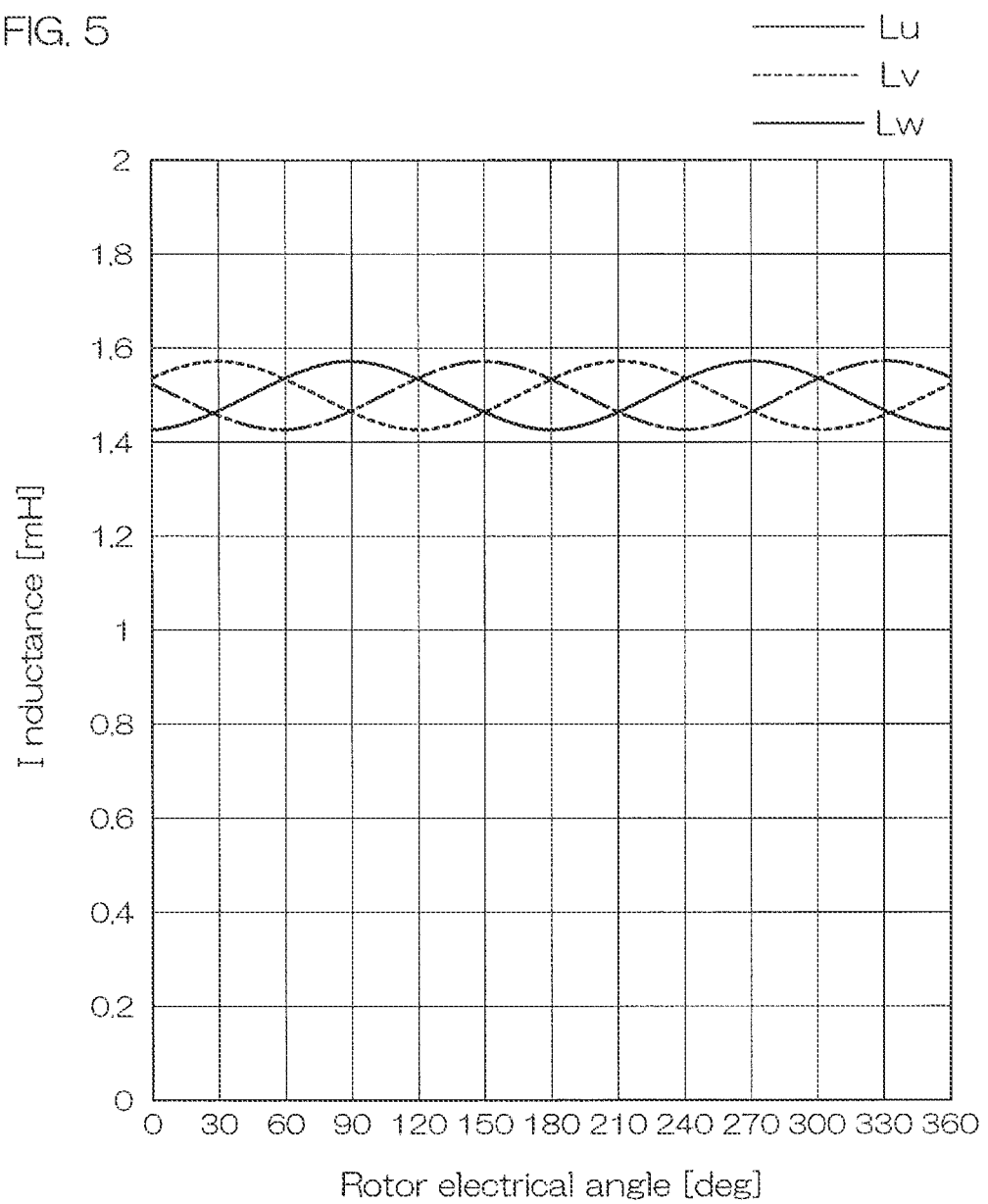
FIG. 5 is a diagram for describing the principle of position detection based on a current derivative value.

FIG. 5 is a diagram for describing the principle of the position detection based on the current derivative values dIuvw. Relationships between the current derivative values dIuvw and the inductances Lu, Lv, Lw of the respective phase windings 5uvw are represented by the following expressions:

$$Vu = Lu \cdot dIu \quad (1)$$

$$Vv = Lv \cdot dIv \quad (2)$$

$$Vw = Lw \cdot dIw \quad (3)$$

Therefore, the inductances Lu, Lv, Lw of the respective phase windings 5uvw can be calculated based on the respective phase voltage commands Vuvw and the respective phase current derivative values dIuvw.

On the other hand, it is known that the respective phase inductances Lu, Lv, Lw periodically fluctuate in a cycle one half the electrical angle cycle of the rotor as shown in FIG. 5. The respective phase inductances Lu, Lv, Lw are represented by the following expressions:

$$Lu = L_0 - L_1 \cos(2\theta) \quad (4)$$

$$Lv = L_0 - L_1 \cos(2(\theta - 2\pi/3)) \quad (5)$$

$$Lw = L_0 - L_1 \cos(2(\theta + 2\pi/3)) \quad (6)$$

wherein $L_0$ is a constant component of the inductance, $L_1$ represents the amplitude of a variable component of the inductance, and θ represents the electrical angular position of the rotor.

Therefore, the electrical angle θ of the rotor can be estimated by determining the respective phase inductances Lu, Lv, Lw.

Figure 6:
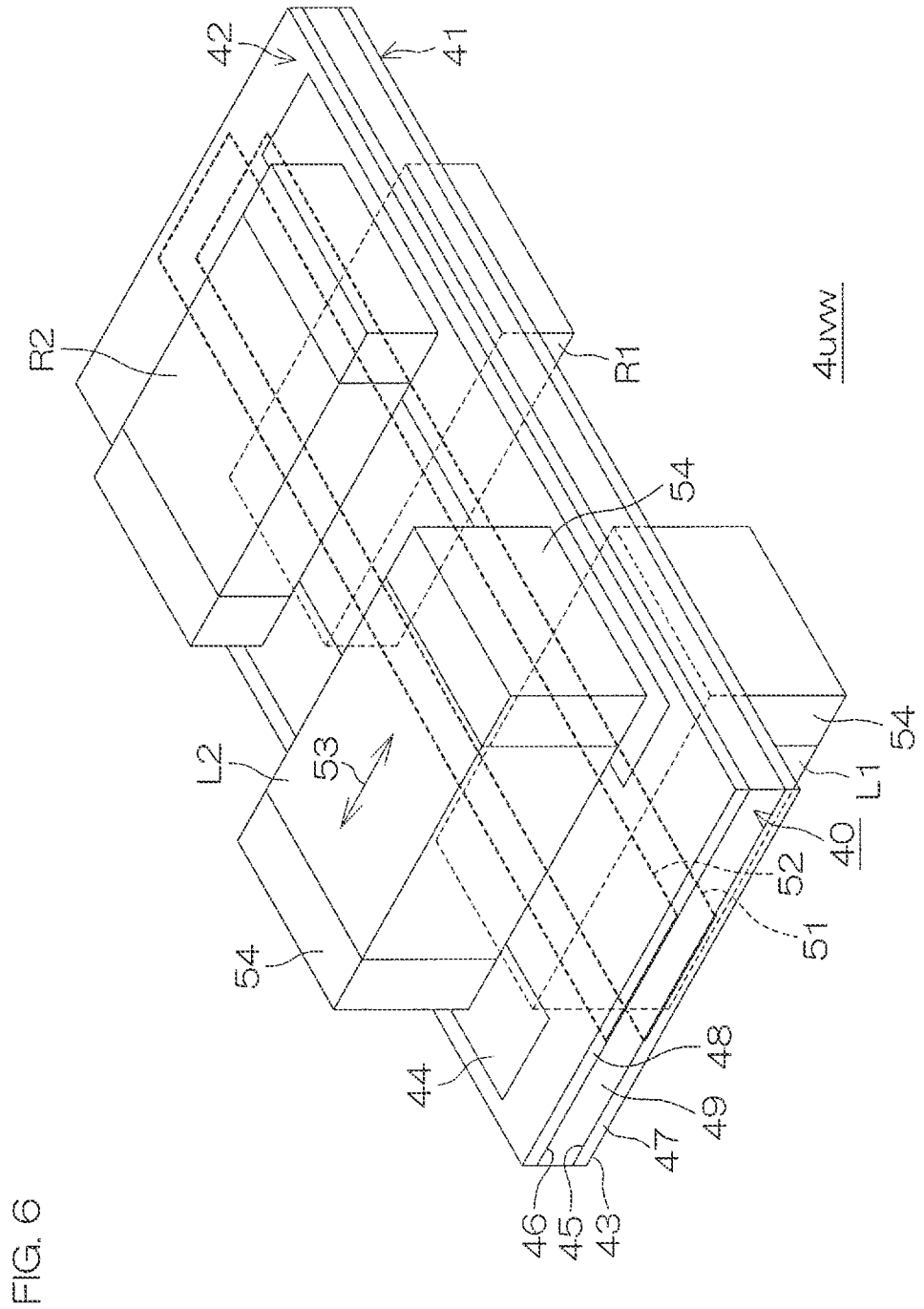
FIG. 6 is a schematic perspective view for describing the structure of a current derivative detector according to a first specific example.
Figure 7A:
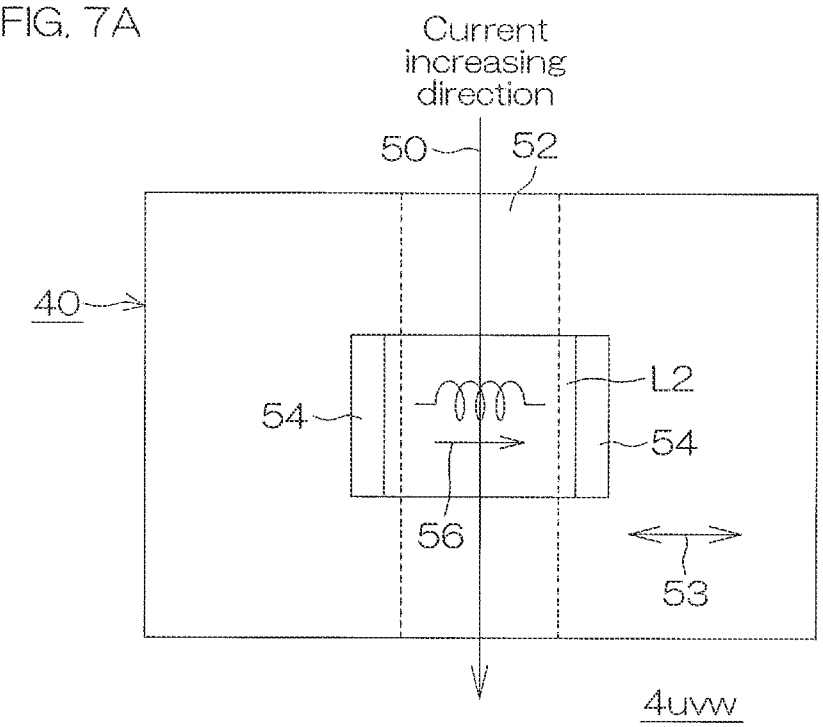
FIG. 7A is a plan view of the current derivative detector.
Figure 7B:
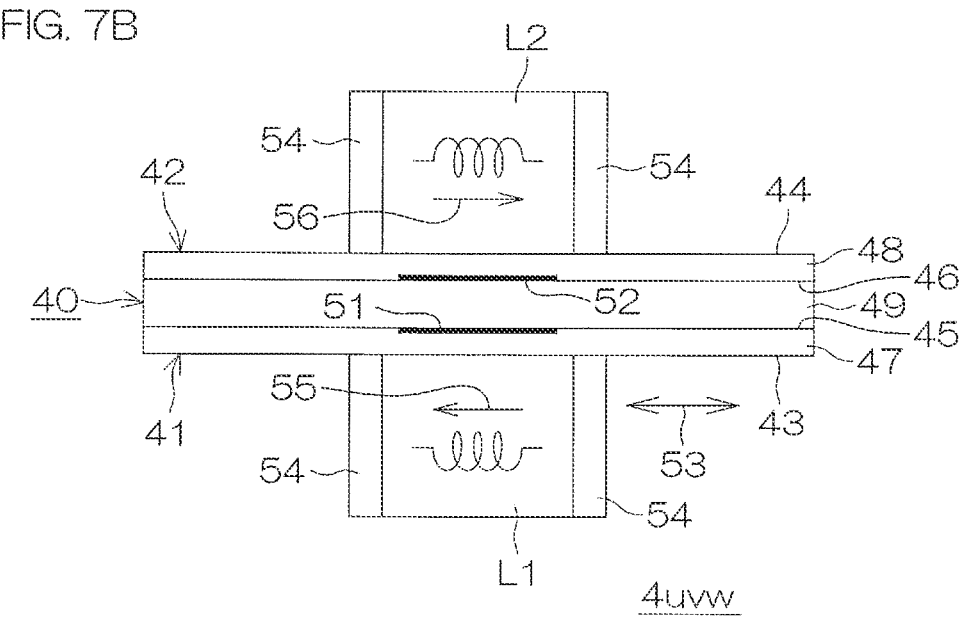
FIG. 7B is a sectional view of the current derivative detector.

FIG. 6 is a schematic perspective view for describing an exemplary structure of the current derivative detector 4uvw according to a first specific example. FIG. 7A is a plan view of the current derivative detector 4uvw, and FIG. 7B is a sectional view of the current derivative detector 4uvw. The current derivative detectors 4uvw for the respective phases have the same structure, and the structure of the current derivative detector 4uvw for each phase is shown in FIGS. 6, 7A and 7B, and FIG. 8 to be described later. That is, the structure shown in FIGS. 6, 7A and 7B, and FIG. 8 to be described later is provided for each of the phases. However, the U-phase, the V-phase and the W-phase preferably share a single printed circuit board 40.

The current derivative detector 4uvw includes the printed circuit board 40, and a plurality of chip inductors L1, L2. The printed circuit board 40 is a multilayer printed wiring board. More specifically, the printed circuit board 40 has a multilayer wiring structure including a plurality of printed wiring layers insulated from each other by insulative substrates. In this example, more specifically, the multilayer printed wiring board herein used includes four printed wiring layers 43 to 46. The four printed wiring layers include a pair of outer printed wiring layers 43, 44 respectively provided in a pair of major surfaces 41, 42 of the printed circuit board 40, and a pair of inner printed wiring layers 45, 46 respectively provided inward of the pair of outer printed wiring layers 43, 44 with the intervention of insulation layers 47, 48 (insulative substrates). Another insulation layer 49 (insulative substrate) is provided between the pair of inner printed wiring layers 45 and 46.

The inner printed wiring layers 45, 46 are respectively formed with current patterns 51, 52 that constitute parts of the current line 9uvw connected to the motor winding 5uvw. The current patterns 51, 52 are shorted at their opposite ends, thereby forming a current path such that the current line 9uvw is branched into two lines at an intermediate position thereof and the two lines are joined together at another position. The two current patterns 51, 52 are opposed to each other perpendicularly to the major surfaces 41, 42 of the printed circuit board 40. The two current patterns 51, 52 are formed in parallel bands (e.g., linear bands), which are opposed to each other with the intervention of the insulation layer 49 (insulative substrate).

The printed circuit board 40 is, for example, a four-layer board having an overall thickness of 1.6 mm. The current patterns 51, 52 of the inner printed wiring layers 46 of the printed circuit board 40 are formed as having the same width and the same thickness in the same position as seen in plan, though being provided in different wiring layers. The current patterns 51, 52 are shorted at their opposite ends, so that substantially equal currents flow therethrough. The inner printed wiring layers 45, 46 are respectively located, for example, 0.2 mm inward of the major surfaces 41, 42 (board surfaces) of the printed circuit board 40.

The pair of chip inductors L1, L2 are respectively mounted on the major surfaces 41, 42 of the printed circuit board 40 in opposed relation to the current patterns 51, 52. These chip inductors L1, L2 are of the same specifications. The pair of chip inductors L1, L2 are respectively mounted on the major surfaces 41, 42 with their coil directions coinciding with a predetermined direction 53 that crosses the current patterns 51, 52, more specifically, orthogonally to the current patterns 51, 52 (as seen in plan). The chip inductors L1, L2 typically each have a small rectangular prism shape, for example, having a size of 2.5 mm×1.8 mm as seen in plan. The chip inductors L1, L2 each have a pair of electrodes 54 provided at opposite ends thereof with respect to the coil direction (e.g., at longitudinally opposite ends thereof). These electrodes 54 are connected to opposite ends of a coil incorporated in the chip inductor L1, L2. The chip inductor L1, L2 is of an air-core coil type and is not magnetically shielded. The coil direction is an electrode-to-electrode direction. The coil direction extends along a coil center axis around which the coil is wound, and coincides with a direction in which magnetic flux is generated when current flows through the coil. The pair of electrodes 54 of the chip inductor L1, L2 are joined to the outer printed wiring layer 43, 44 formed in the corresponding major surface 41, 42 of the printed circuit board 40 by a joining material (not shown) such as solder. In this embodiment, the pair of chip inductors L1, L2 respectively mounted on the major surfaces 41, 42 of the printed circuit board 40 are superposed on each other as seen perpendicularly to the major surfaces 41, 42 of the printed circuit board 40. In other words, the pair of chip inductors L1, L2 are disposed in opposed parallel relation to each other with the current patterns 51, 52 interposed therebetween.

When current flows through the current patterns 51, 52, the current generates magnetic flux around the current patterns 51, 52. The magnetic flux is directed in opposite directions as observed on the one major surface 41 and on the other major surface 42 of the printed circuit board 40, and is parallel to the coil directions of the chip inductors L1, L2 (predetermined direction 53). Therefore, the magnetic flux generated by the current flowing through the current patterns 51, 52 interlinks with the chip inductors L1, L2. As the magnetic flux increases, electromotive forces occur in the respective chip inductors L1, L2 so as to cause a current flow that prevents the increase in the magnetic flux. Where the current flowing through the current patterns 51, 52 increases in an arrow direction 50 (see FIG. 7A), for example, the chip inductors L1, L2 respectively generate the electromotive forces in arrow directions 55 and 56 (see FIG. 7B) to prevent the change in the magnetic flux due to the current increase. Similarly, as the magnetic flux decreases, electromotive forces occur in the chip inductors L1, L2 so as to cause a current flow that prevents the decrease in the magnetic flux. Therefore, the electromotive forces occurring in the chip inductors L1, L2 correspond to the time-differential value of the current flowing through the current patterns 51, 52. Since the geometrical arrangements of the chip inductors L1, L2 with respect to the current patterns 51, 52 are symmetrical, the electromotive forces generated by the chip inductors L1, L2 are substantially equal to each other. The expression "the geometrical arrangements are symmetrical" means that distances from the current patterns 51, 52 to the chip inductors L1, L2 are substantially equal to each other. That is, the total distance from the two current patterns 51, 52 to the chip inductor L1 is substantially equal to the total distance from the two current patterns 51, 52 to the chip inductor L2.

As shown in FIG. 6, a pair of load resistors R1, R2 are respectively mounted on the major surfaces 41, 42 of the printed circuit board 40, and are respectively connected to the chip inductors L1, L2 mounted on the same major surfaces 41, 42. The load resistors R1, R2 are, for example, chip resistors having the same resistance value. The electrodes of the load resistors R1, R2 are respectively connected to the electrodes 54 of the chip inductors L1, L2 via the outer printed wiring layers 43, 44.

Figure 8:
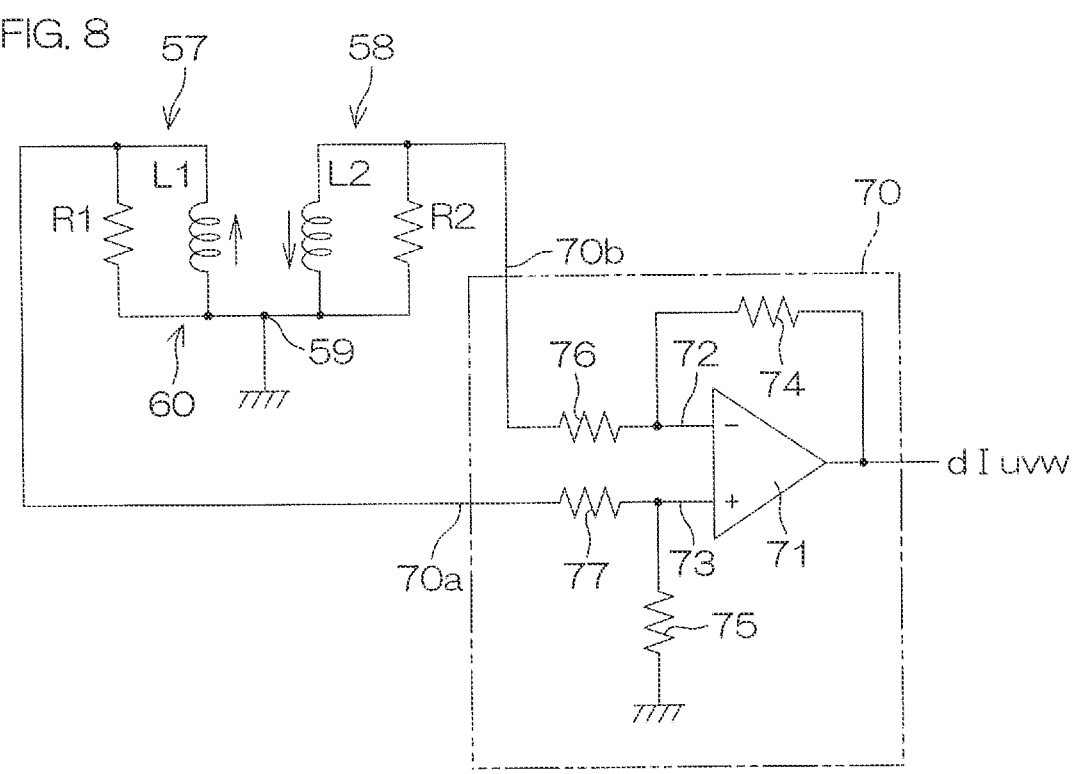
FIG. 8 is an electric circuit diagram showing the configuration of the current derivative detector by way of example.

FIG. 8 is an electric circuit diagram showing an exemplary structure of the current derivative detector 4uvw. The chip inductor L1 mounted on the one major surface of the printed circuit board 40 and the chip inductor L2 mounted on the other major surface of the printed circuit board 40 are connected in series to form a series circuit 60. The load resistors R1, R2 are connected in parallel to the chip inductors L1, L2. In other words, a parallel circuit 57 including the chip inductor L1 and the load resistor R1 mounted on the one major surface 41 of the printed circuit board 40 and a parallel circuit 58 including the chip inductor L2 and the load resistor R2 mounted on the other major surface 42 of the printed circuit board 40 are connected in series.

The two chip inductors L1, L2 are connected to each other to form the series circuit 60 so that the electromotive forces attributable to the change in the current flowing through the current patterns 51, 52 are superposed together, i.e., are not offset. In other words, the two chip inductors L1, L2 are connected in series so that the electromotive forces of the two chip inductors L1, L2 occur in the same direction between the opposite ends of the series circuit 60 (this direction is reversed depending on whether the current flowing through the current patterns 51, 52 increases or decreases).

The two chip inductors L1, L2 are connected to each other at a midpoint 59, which is connected to a ground potential (0 V) that is a stable reference potential. The opposite ends of the series circuit 60 of the two chip inductors L1, L2 are connected to a differential amplification circuit 70. The differential amplification circuit 70 includes an operational amplifier 71 and four resistors 74 to 77. The four resistors 74 to 77 includes a resistor 74 connected between an output terminal and an inverting input terminal 72 of the operational amplifier 71, a resistor 75 connected between a non-inverting input terminal 73 of the operational amplifier 71 and the ground potential (0 V), and resistors 76 and 77 respectively connected to the inverting input terminal 72 and the non-inverting input terminal 73 of the operational amplifier 71. One of the opposite ends of the series circuit 60 of the chip inductors L1, L2 is connected to one input terminal 70b of the differential amplification circuit 70, and further connected to the inverting input terminal 72 of the operational amplifier 71 via the resistor 76. The other end of the series circuit 60 is connected to the other input terminal 70a of the differential amplification circuit 70, and further connected to the non-inverting input terminal 73 of the operational amplifier 71 via the resistor 77.

The electric/electronic components of the differential amplification circuit 70 are preferably mounted on the printed circuit board 40. Though not shown, some or all of the electric/electronic components of the motor control device 100 shown in FIG. 1 are preferably also mounted on the printed circuit board 40.

If the current flowing through the current patterns 51, 52 is changed, voltages $V_{L1}$, $V_{L2}$ ($V_{L1}=V_{L2}=V_L$) are respectively generated between the terminals of the chip inductor L1 and between the terminals of the chip inductor L2 proportionally to a change $d\Phi/dt$ in magnetic flux $\Phi$ with time by an electromagnetic induction action. The voltages are represented by the following expression by using a proportionality constant K.

$$V_L = V_{L1} = V_{L2} = K \cdot d\Phi/dt \quad (7)$$

Since the magnitude of the magnetic flux $\Phi$ is proportional to the current I (phase current Iuvw), the above expression can be rewritten to the following expression. This indicates that a voltage output proportional to the current derivative value dI/dt can be provided. K' is a proportionality constant.

$$V_L = K' \cdot dI/dt \quad (8)$$

Since the chip inductors L1, L2 are connected in series in the circuit configuration described above, the output $V_0$ of the differential amplification circuit 70 is represented by the following expression with the use of the gain G of the differential amplification circuit 70. The output $V_0$ is a signal indicating the current derivative value dIuvw.

$$V_0 = 2 \cdot G \cdot V_L \quad (9)$$

The current patterns 51, 52 respectively extending in the inner printed wiring layers 45, 46 of the printed circuit board 40 serve as a single-turn primary winding, and the chip inductors L1, L2 respectively mounted on the major surfaces 41, 42 of the printed circuit board 40 serve as secondary windings, whereby a transformer is provided. In principle, the current derivative can be detected simply by differentially amplifying the inter-electrode voltage of a single chip inductor. However, a signal voltage obtained from a single small-size air-core chip inductor is weak on the order of several millivolts. On the other hand, the inverter 2 that controls the motor current generates greater noises by switching. Hence, it is necessary to make the device less susceptible to the noises. In this embodiment, therefore, the plurality of chip inductors L1, L2 (specifically, the two chip inductors L1, L2) are used.

If the inter-electrode voltage of the single chip inductor (only one chip inductor L1 or L2) is differentially amplified, the following problems will arise:

The chip inductors each have a higher impedance at opposite ends thereof with respect to the ground potential (0 V), and the potential is liable to fluctuate. The chip inductors are disposed above the current patterns 51, 52 and the insulation layers (e.g., each having a thickness of 0.2 mm) are provided between the chip inductors and the current patterns 51, 52, so that stray capacitances are present. The potentials of the current patterns 51, 52 fluctuate within a range from the ground potential (0 V) to a power supply voltage Vdc by the switching in the inverter 2. Similarly, the potentials of the chip inductors are influenced via the stray capacitances by the switching to thereby fluctuate, so that the inter-terminal voltages of the chip inductors fluctuate in phase.

Where two signals to be inputted to the differential amplification circuit 70 fluctuate in phase, the differential amplification circuit 70 can remove the in-phase fluctuation. However, the operational amplifier 71 has a limited input voltage range, so that the input of a voltage higher than the voltage range may result in breakage and improper output. Although it is conceivable to reduce the input voltage by resistive voltage division, the voltage of a signal component is also divided into a lower level. This problematically reduces the signal-to-noise ratio.

The fluctuation may be suppressed by reducing the impedances of the chip inductors at their opposite terminals, but the signal levels are problematically reduced because of a higher impedance of the signal source.

Another conceivable approach to the suppression of the in-phase voltage fluctuation is to connect one of the terminals of the chip inductor to a stable potential (e.g., the ground potential (0 V)). However, an imbalance in signal impedance in the differential amplification circuit 70 may cause noises. Specifically, the terminal connected to the ground potential has a lower impedance and, therefore, is less susceptible to potential fluctuation due to the switching. In contrast, the other terminal has a higher impedance and, therefore, suffers from the potential fluctuation, which cannot be cancelled to result in the output of noises.

In this specific example, therefore, the two chip inductors L1, L2 are connected in series to form the series circuit 60, and the midpoint 59 of the series circuit 60 is connected to the ground potential (0 V). Further, the load resistors R1, R2 are respectively connected between the midpoint 59 and the opposite ends of the series circuit 60, and the opposite ends of the series circuit 60 are respectively connected to the two input terminals 70a, 70b of the differential amplification circuit 70. This makes it possible to eliminate the impedance imbalance while suppressing the in-phase (common mode) voltage fluctuation. Thus, the in-phase noises can be removed.

In addition, in this specific example, the two chip inductors L1, L2 are respectively mounted on the opposite major surfaces 41, 42 of the printed circuit board 40. The two chip inductors L1, L2 are connected in series so that the magnetic flux generated by the current flowing through the current patterns 51, 52 is directed in opposite directions as observed on the opposite major surfaces 41, 42 of the printed circuit board 40 to interlink with the two chip inductors L1, L2 and the electromotive forces occurring due to the change in the magnetic flux are superposed together. Even in an environment in which magnetic flux is externally generated in the same direction as observed on the opposite major surfaces 41, 42 of the printed circuit board 40, therefore, electromotive forces generated by the two chip inductors L1, L2 due to a change in this magnetic flux can be cancelled.

Figure 9:
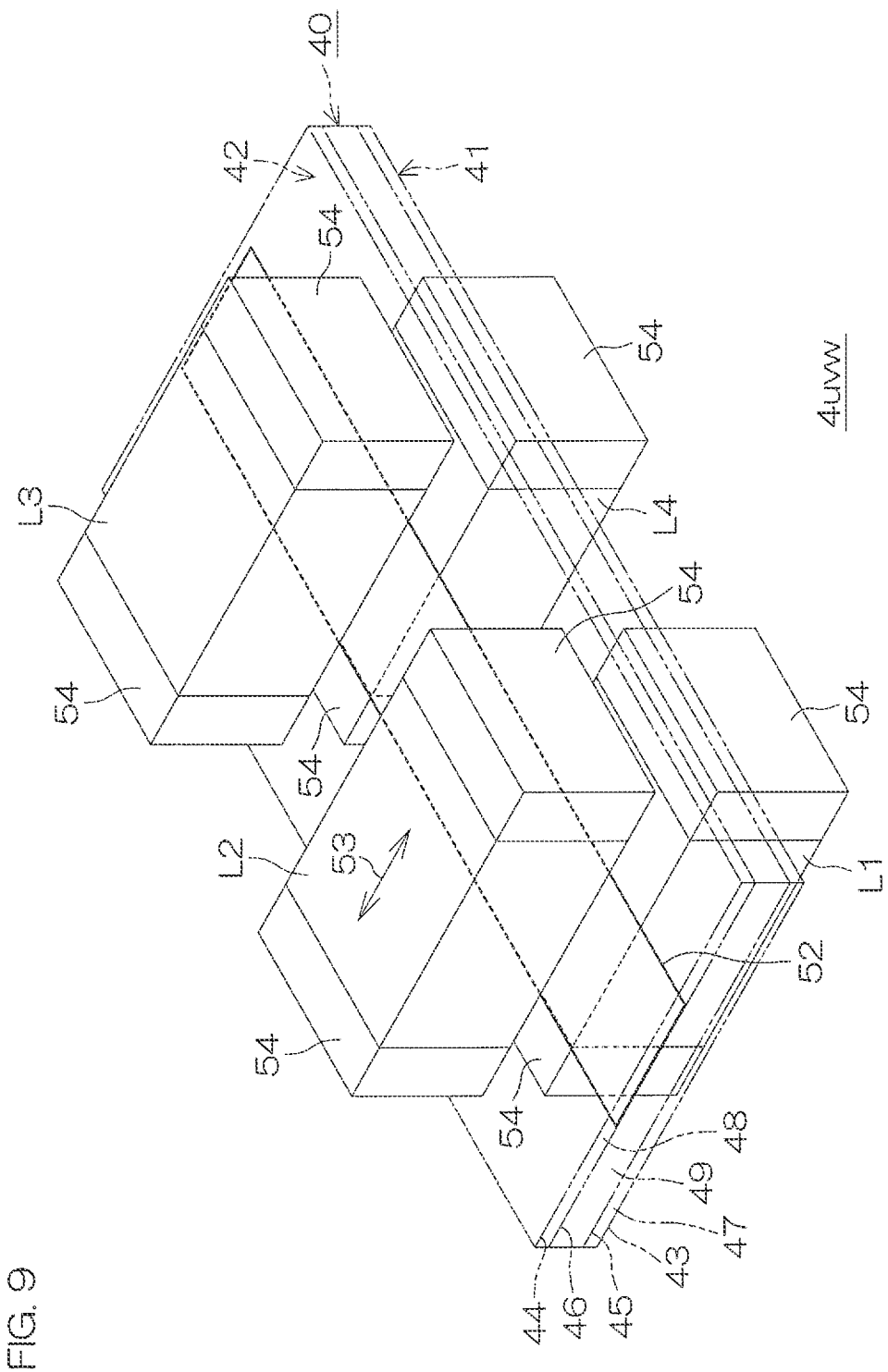
FIG. 9 is a schematic perspective view for describing the structure of a current derivative detector according to a second specific example.
Figure 10A:
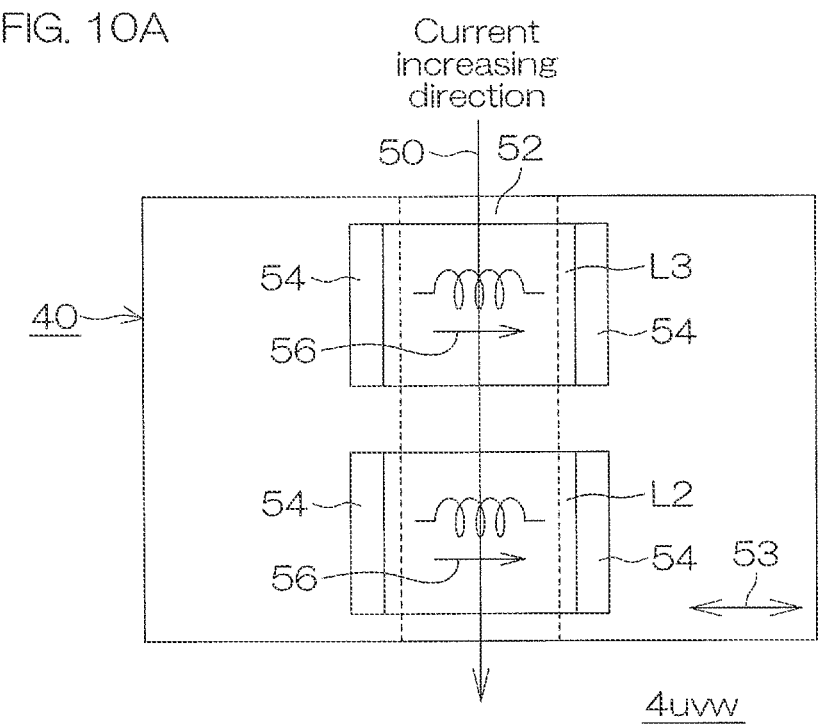
FIG. 10A is a plan view of the current derivative detector.
Figure 10B:
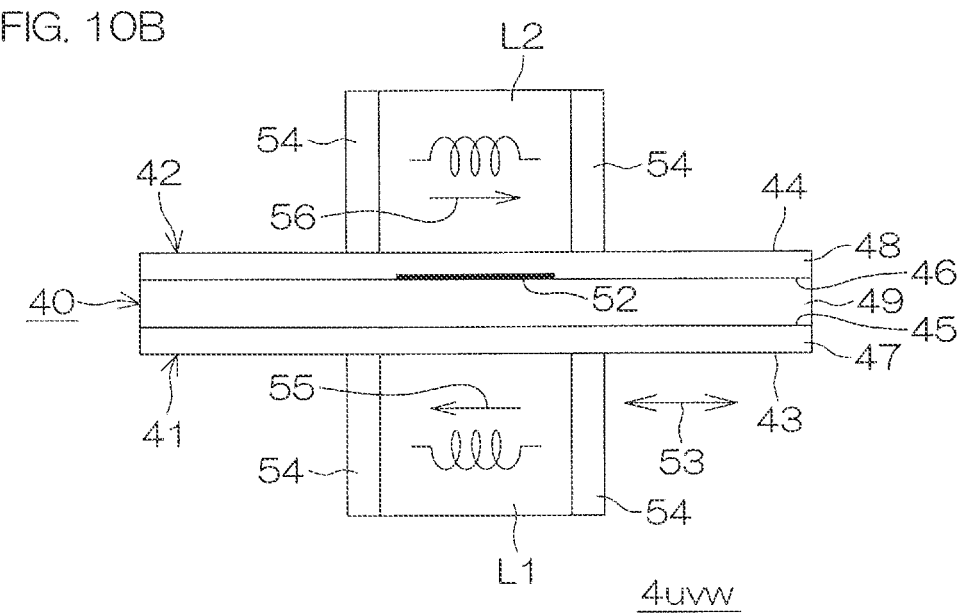
FIG. 10B is a sectional view of the current derivative detector.
Figure 11:
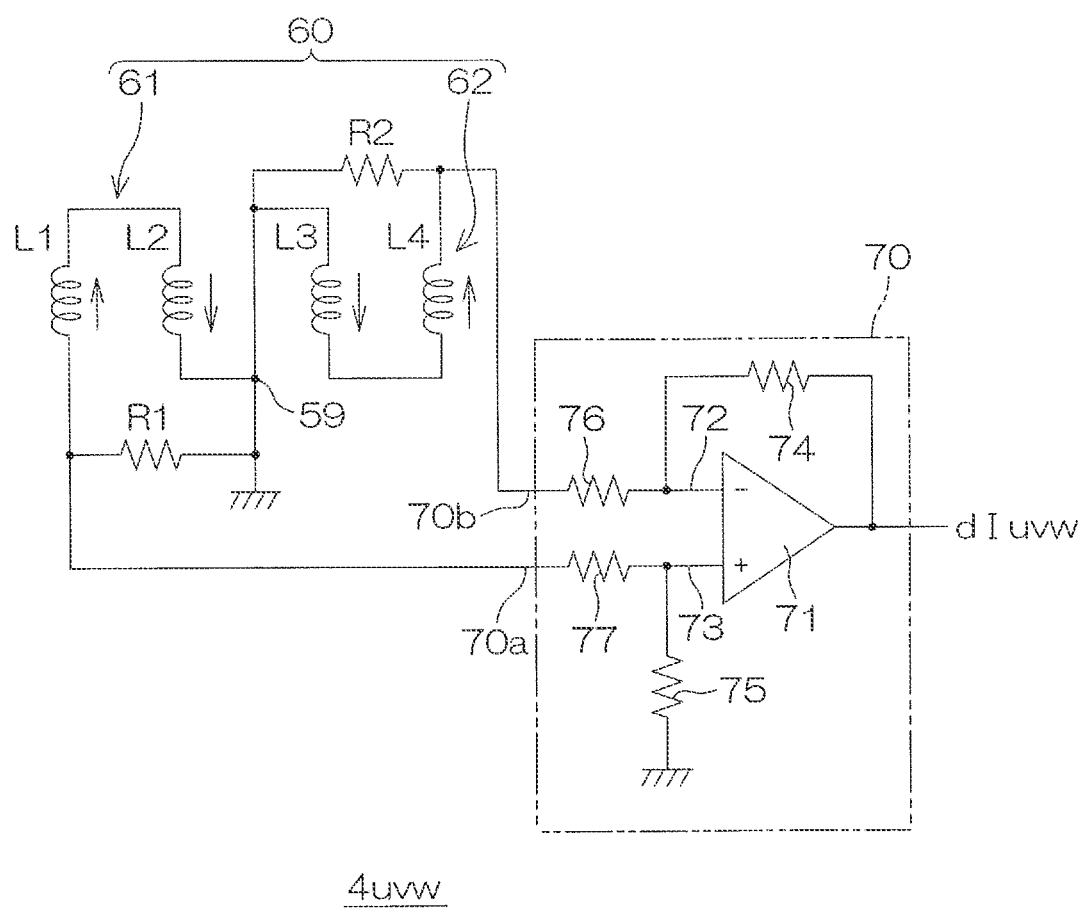
FIG. 11 is an electric circuit diagram showing an exemplary structure of the current derivative detector.

FIG. 9 is a schematic perspective view for describing another exemplary structure of the current derivative detector 4*uvw* according to a second specific example. FIG. 10A is a plan view of the current derivative detector 4*uvw*, and FIG. 10B is a sectional view of the current derivative detector 4*uvw*. FIG. 11 is an electric circuit diagram showing an exemplary configuration of the current derivative detector 4*uvw*. In FIGS. 9, 10A, 10B and 11, the structure of the current derivative detector 4*uvw* for each phase is shown. That is, the structure shown in FIGS. 9, 10A, 10B and 11 is provided for each of the phases. However, the U-phase, the V-phase and the W-phase preferably share the single printed circuit board 40.

As in the first specific example, the current derivative detector 4*uvw* includes the printed circuit board (shown by a two-dot-and-dash line in FIG. 9) and a plurality of chip inductors L1 to L4. The printed circuit board 40 is a multilayer printed wiring board as in the first specific example. In this example, however, only one of the pair of inner printed wiring layers 45, 46 is formed with a current pattern 52 that constitutes a part of the current line 9*uvw* connected to the motor winding 5*uvw*. The current pattern 52 has a band shape (e.g., a linear band shape). The current pattern 52 (inner printed wiring layer 46) is located, for example, 1.4 mm inward of the one major surface 41 of the printed circuit board 40 and is located, for example, 0.2 mm inward of the other major surface 42 (board front surface).

Of the chip inductors L1 to L4, two chip inductors L1, L4 are mounted on the one major surface 41 of the printed circuit board 40 in opposed relation to the current pattern 52. Similarly, the other two chip inductors L2, L3 are mounted on the other major surface 42 in opposed relation to the current pattern 52. In this specific example, these four chip inductors L1 to L4 are chip inductors of the same specifications. The four chip inductors L1 to L4 are mounted on the major surfaces 41, 42 of the printed circuit board 40 with their coil directions coinciding with a predetermined direction 53 that crosses the current pattern 52, more specifically, orthogonally to the current pattern 52 (as seen in plan).

As in the first specific example, the chip inductors L1 to L4 typically each have a small rectangular prism shape, for example, having a size of 2.5 mm×1.8 mm as seen in plan. The chip inductors L1 to L4 each have a pair of electrodes 54 provided at opposite ends thereof with respect to the coil direction (e.g., at longitudinally opposite ends thereof). The electrodes 54 are connected to opposite ends of a coil incorporated in the chip inductor L1 to L4. The chip inductor L1 to L4 is of an air-core coil type and is not magnetically shielded. The coil direction is an electrode-to-electrode direction.

Though not shown in detail, the pair of electrodes 54 of the chip inductor L1 to L4 are joined to the outer printed wiring layer 43, 44 formed in the corresponding major surface 41, 42 of the printed circuit board 40 by a joining material (not shown) such as solder. In this embodiment, one pair of chip inductors L1, L2 respectively mounted on the major surfaces 41, 42 of the printed circuit board 40 are superposed on each other as seen perpendicularly to the major surfaces 41, 42 of the printed circuit board 40. Similarly, the other pair of chip inductors L3, L4 respectively mounted on the major surfaces 41, 42 of the printed circuit board 40 are superposed on each other as seen perpendicularly to the major surfaces 41, 42 of the printed circuit board 40. In other words, the one pair of chip inductors L1, L2 are disposed in opposed parallel relation to each other with the printed circuit board 40 (more specifically, the current pattern 52) interposed therebetween, and the other pair of chip inductors L3, L4 are disposed in opposed parallel relation to each other with the printed circuit board 40 (more specifically, the current pattern 52) interposed therebetween. The chip inductors L1 to L4 may have different specifications. However, it is preferred that the chip inductors L1, L4 disposed on the one major surface 41 of the printed circuit board 40 have the same specifications, and the chip inductors L2, L3 disposed on the other major surface 42 have the same specifications.

The one pair of chip inductors L1, L2 opposed to each other with the intervention of the printed circuit board 40 are connected in series via a wiring layer provided in the printed circuit board 40 to form a series circuit 61. A load resistor R1 (see FIG. 11) is connected between the opposite ends of the series circuit 61 via the wiring layer provided in the printed circuit board 40. The other pair of chip inductors L3, L4 opposed to each other with the intervention of the printed circuit board 40 are connected in series via the wiring layer provided in the printed circuit board 40 to form a series circuit 62. A load resistor R2 (see FIG. 11) is connected between the opposite ends of the series circuit 62 via the wiring layer provided in the printed circuit board 40. The load resistors R1, R2 are, for example, chip resistors. In FIGS. 9, 10A and 10B, the load resistors R1, R2 are not shown.

The series circuit 61 including the one pair of chip inductors L1, L2 opposed to each other with the intervention of the printed circuit board 40 and the series circuit 62 including the other pair of chip inductors L3, L4 opposed to each other with the intervention of the printed circuit board 40 are further connected in series to form a series circuit 60. The four chip inductors L1 to L4 are connected together to form the series circuit 60 so that electromotive forces attributable to a change in the current flowing through the current pattern 52 are superposed together (i.e., are not offset). In other words, the four chip inductors L1 to L4 are connected in series so that the electromotive forces of the chip inductors L1 to L4 occur in the same direction between the opposite ends of the series circuit 60 (this direction is reversed depending on whether the current flowing through the current pattern 52 increases or decreases).

The two series circuits 61, 62 respectively including the pairs of chip inductors L1, L2; L3, L4 are connected to each other at a midpoint 59, which is connected to a ground potential (0 V) that is a stable reference potential. The opposite ends of the series circuit 60 including the four chip inductors L1 to L4 are respectively connected to two input terminals 70a, 70b of a differential amplification circuit 70. The differential amplification circuit 70 has the same configuration as in the first specific example and, therefore, the description thereof is omitted.

When current flows through the current pattern 52, the current generates magnetic flux around the current pattern 52. The magnetic flux is directed in opposite directions as observed on the one major surface 41 and on the other major surface 42 of the printed circuit board 40, and is parallel to the coil directions (predetermined direction 53) of the chip inductors L1 to L4. Therefore, the magnetic flux generated by the current flowing through the current pattern 52 interlinks with the chip inductors L1 to L4. As the magnetic flux increases, electromotive forces occur in the respective chip inductors L1 to L4 so as to cause a current flow that prevents the increase in the magnetic flux. Where the current flowing through the current pattern 52 increases in an arrow direction 50 (see FIG. 10A), for example, the chip inductors L1, L4; L2, L3 respectively generate the electromotive forces in arrow directions 55 and 56 (see FIG. 10B) so as to prevent the change in the magnetic flux due to the current increase. Similarly, as the magnetic flux decreases, electromotive forces occur in the respective chip inductors L1 to L4 so as to cause a current flow that prevents the decrease in the magnetic flux. Thus, the electromotive forces occurring in the chip inductors L1 to L4 correspond to the time-differential value of the current flowing through the current pattern 52.

In this example, the current pattern 52 provided in the printed circuit board 40 is formed only in the inner printed wiring layer 46 adjacent to the other major surface 42. Therefore, distances from the current pattern 52 to the chip inductors L1, L4 mounted on the one major surface 41 are different from distances from the current pattern 52 to the chip inductors L2, L3 mounted on the other major surface 42. That is, the distances to the chip inductors L1, L4 on the one major surface 41 are longer than the distances to the chip inductors L2, L3 on the other major surface 42. Accordingly, voltages induced in the chip inductors L1 to L4 are different. Specifically, the chip inductors L2, L3 generate greater electromotive forces than the chip inductors L1, L4.

The distances from the current pattern 52 to the chip inductors L1 to L4 are different. Therefore, if the current derivative detector 4uvw is configured so that only the chip inductors L1, L2 are respectively mounted on the one major surface 41 and the other major surface 42 as in the first specific example, the voltages between the midpoint 59 and the opposite ends of the series circuit 60 of the chip inductors L1, L2 are imbalanced.

In the second specific example, therefore, the two chip inductors L1, L4 are disposed on the one major surface 41 of the printed circuit board 40, and the two chip inductors L2, L3 are disposed on the other major surface 42 of the printed circuit board 40. The chip inductors L1 and L4 on the one major surface 41 are respectively connected in series to the chip inductors L2 and L3 on the other major surface 42, whereby the two series circuits 61, 62 are formed. The load resistors R1 and R2 are respectively connected in parallel between the opposite ends of the series circuit 61 and between the opposite ends of the series circuit 62. These two series circuits 61, 62 are connected in series to form the series circuit 60. Thus, the series circuit 60 can be balanced on opposite sides of the midpoint 59 thereof. That is, the series circuit 60 of the chip inductors L1 to L4 is configured so as to ensure symmetrical output voltages at the opposite ends of the series circuit 60 with respect to the midpoint 59. As a result, the opposite ends of the series circuit 60 of the four chip inductors L1 to L4 are respectively connected to the input terminals 70a, 70b of the differential amplification circuit 70, whereby an output can be provided from the differential amplification circuit 70 as in the first specific example.

The total magnitude of the inputs to the differential amplification circuit 70 is equivalent to the sum of the output voltages of the four chip inductors L1 to L4, and does not depend on the order of the chip inductors L1 to L4 connected in series. If the connection order is changed so that a series circuit including the two chip inductors L1, L4 connected in series on the one major surface and a series circuit including the two chip inductors L2, L3 connected in series on the other major surface are connected to each other, the output voltages at the opposite ends of the series circuit of the chip inductors L1 to L4 are not symmetrical with respect to the midpoint. Even with this configuration, the current derivative detection is possible. In the case of a differential amplification circuit 70 that is operative at a higher speed with minute voltages, however, the voltages at the opposite ends of the series circuit of the chip inductors L1 to L4 are preferably symmetrical with respect to the midpoint 59, because the signal quality can be properly maintained.

Figure 11A:
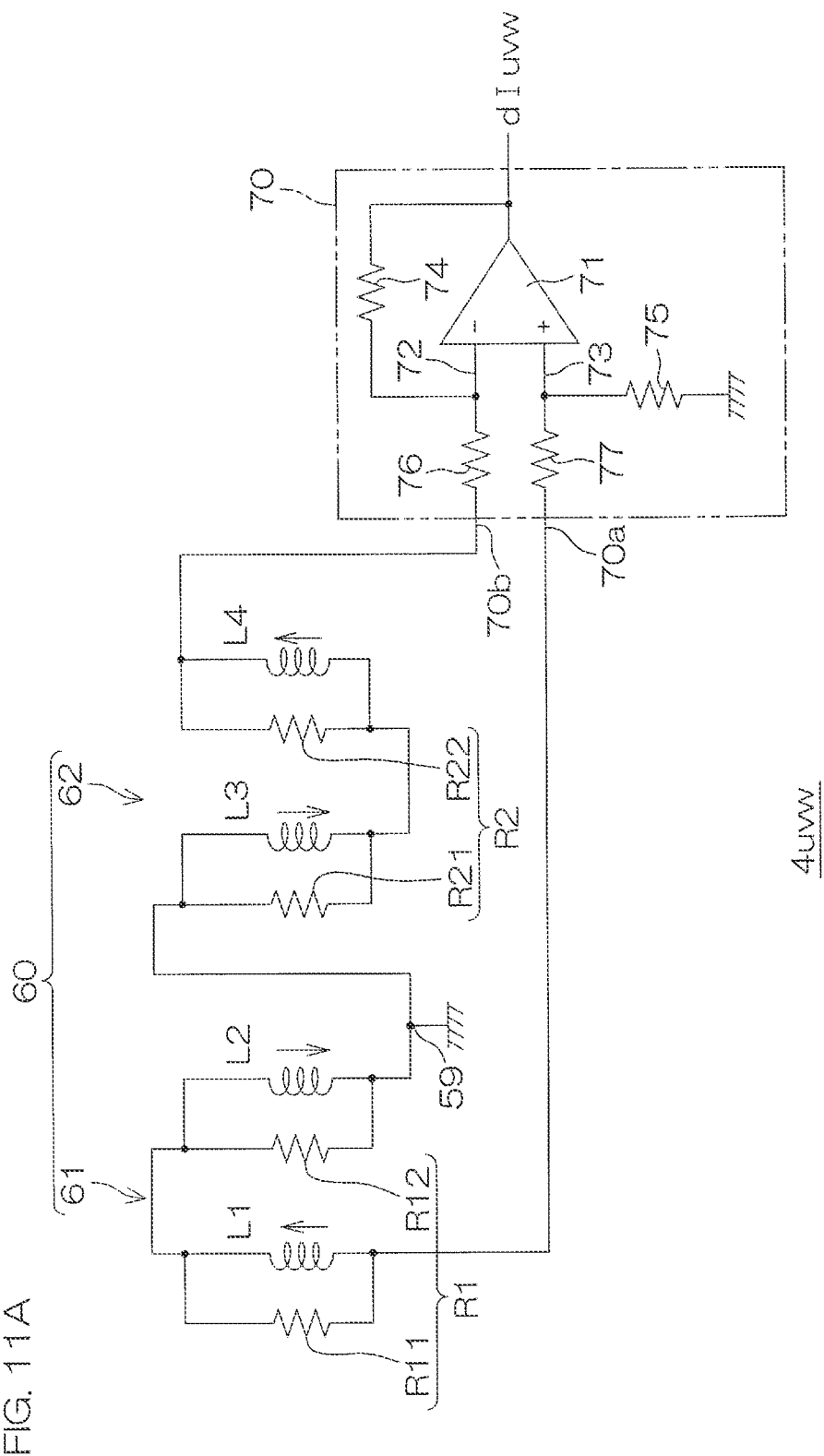
FIG. 11A is an electric circuit diagram showing another exemplary structure of the current derivative detector.

As shown in FIG. 11A, the load resistor R1 may be divided into load resistors R11, R12 respectively connected between the opposite terminals of the chip inductor L1 and between the opposite terminals of the chip inductor L2. Similarly, the load resistor R2 may be divided into load resistors R21, R22 respectively connected between the opposite terminals of the chip inductor L3 and between the opposite terminals of the chip inductor L4. In this case, the two load resistors R11, R12 are connected in series to form the load resistor R1, and the two load resistors R21, R22 are connected in series to form the load resistor R2.

Figure 12:
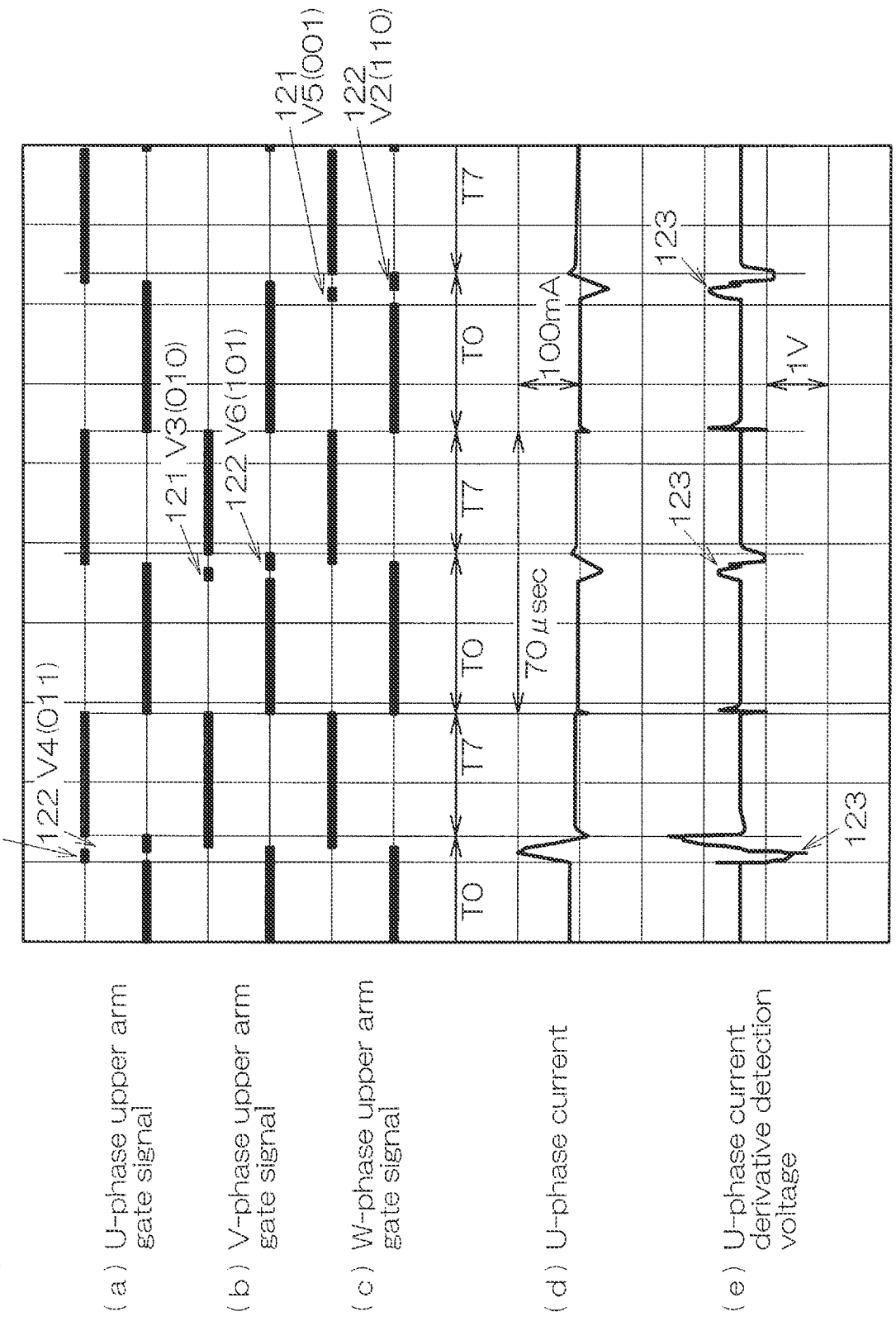
FIG. 12 is an exemplary waveform diagram showing PWM control signals and the like when an AC motor M is rotated at a lower rotation speed.

FIG. 12 is an exemplary waveform diagram showing the PWM control signals and the like when the AC motor M is rotated at a lower rotation speed (or in a halt state). In FIG. 12, (a) shows the waveform of a U-phase upper arm gate signal which is applied to the gate of the upper arm switching device 21$u$ of the U-phase bridge circuit 20$u$ of the inverter 2. A U-phase lower arm gate signal (which is applied to the gate of the lower arm switching device 22$u$) has a waveform obtained by inverting the U-phase upper arm gate signal. In FIG. 12, (b) shows the waveform of a V-phase upper arm gate signal which is applied to the gate of the upper arm switching device 21$v$ of the V-phase bridge circuit 20$v$ of the inverter 2. A V-phase lower arm gate signal (which is applied to the gate of the lower arm switching device 22$v$) has a waveform obtained by inverting the V-phase upper arm gate signal. In FIG. 12, (c) shows the waveform of a W-phase upper arm gate signal which is applied to the gate of the upper arm switching device 21$w$ of the W-phase bridge circuit 20$w$ of the inverter 2. A W-phase lower arm gate signal (which is applied to the gate of the lower arm switching device 22$w$) has a waveform obtained by inverting the W-phase upper arm gate signal. In FIG. 12, (d) shows a change in the U-phase current Iu outputted by the U-phase current detector 3$u$. In FIG. 12, (e) shows a change in the time-differential value of the U-phase current, i.e., the U-phase current derivative value dIu, which corresponds to the output of the U-phase current derivative detector 4$u$.

As shown in FIG. 3, the inverter 2 is the three-phase inverter constituted by the six switching devices 21$uvw$, 22$uvw$, and the terminals of the three windings 5$uvw$, i.e., the U-phase, the V-phase and the W-phase windings 5$uvw$, of the AC motor M are connected to either the power supply voltage Vdc or the ground potential (0 V). As described above, the state in which the winding 5$uvw$ is connected to the power supply voltage Vdc (i.e., the upper arm switching device 21$uvw$ is on) is represented as "1" and the state in which the winding 5$uvw$ is connected to 0 V (i.e., the upper arm switching device 21$uvw$ is off) is represented by "0." Then, as shown in FIG. 4A, the voltage vectors to be generated include the eight voltage vectors V0 (0,0,0) to V7 (1,1,1). Of these, the voltage vectors V0 (0,0,0) and V7 (1,1,1) are zero-voltage vectors for which the voltage applied across the windings 5$uvw$ is zero with all the winding terminals at the same potential. The other six voltage vectors V1 to V6 are non-zero voltage vectors for which a voltage is applied across the windings 5$uvw$.

The PWM generator 14 generates PWM control signals to turn on and off the switching devices 21$uvw$, 22$uvw$ of the inverter 2 by comparing the respective phase voltage commands Vuvw outputted from the current controller 13 with a triangular carrier signal. For example, a frequency for the PWM (the frequency of the triangular carrier signal) is 14 kHz, which corresponds to a cycle of about 70 μsec. When the motor rotation speed is low, the phase voltage commands Vuvw are low, so that the periods of the zero-voltage vectors V0, V7 during which no voltage is applied across the windings 5$uvw$ are prolonged. FIG. 12 shows waveforms observed when the period T0 of the zero-voltage vector V0 and the period T7 of the zero-voltage vector V7 are each set to about one half the cycle of the PWM and the AC motor M is stopped.

The PWM generator 14 has the function of applying a test pulse 121 for the detection of the rotor position during the period of the zero voltage vector V0 or V7 in addition to the function of generating the PWM control signals. The test pulse 121 herein means a voltage vector for the position detection. A period during which the test pulse 121 is applied is sufficiently shorter than the PWM cycle (e.g., about 70 μsec) and sufficiently shorter than one half the PWM cycle. More specifically, the test pulse application period is preferably not greater than 10% of the PWM cycle, more preferably not greater than 5% of the PWM cycle. Where the test pulse application period is 3 μsec and the PWM cycle is 70 μsec, for example, the test pulse application period is about 4.2% of the PWM cycle.

In order to minimize the influence of the test pulse 121, it is preferred to apply an offset pulse 122 defined by a voltage vector having a direction opposite to that of the test pulse 121 for a period equivalent to that of the test pulse 121 to offset the current of the test pulse 121 immediately after the application of the test pulse 121. In this case, the period during which the voltage is applied for the position detection is twice the test pulse application period. Where the test pulse application period is 3 μsec and the offset pulse application period is 3 μsec, for example, 6 μsec (i.e., 8.5% of the 70-μsec PWM cycle) is used for the voltage application for the position detection, and the remaining 64 μsec (i.e., 91.5% of the PWM cycle) is used for the ordinary motor control.

Three voltage vectors for the test pulse 121 and three voltage vectors for the offset pulse 122 that respectively correspond to the voltage vectors for the test pulse 121 are used to apply the test pulse 121 and the offset pulse 122 for the offset of the test pulse 121 in the order of the U-phase, the V-phase and the W-phase in each PWM cycle. Thus, the influence of the application of the test pulse 121 for the position detection can be equalized among the three phases.

In the example of FIG. 12, the test pulse 121 applied to the U-phase is represented by the voltage vector V1 (1,0,0), and the offset pulse 122 applied to the U-phase is represented by the voltage vector V4 (0,1,1). The test pulse 121 applied to the V-phase is represented by the voltage vector V3 (0,1,0), and the offset pulse 122 applied to the V-phase is represented by the voltage vector V6 (1,0,1). The test pulse 121 applied to the W-phase is represented by the voltage vector V5 (0,0,1), and the offset pulse 122 applied to the W-phase is represented by the voltage vector V2 (1,1,0).

In response to the application of the test pulse 121 and the offset pulse 122, as shown by (d) and (e) in FIG. 12, the U-phase current changes, and the U-phase current derivative detection voltage changes. Since not only the current but also the current derivative value are directly detected, it can be seen that the U-phase current derivative detection voltage rises instantaneously upon the application of the test pulse 121. Thus, the current derivative value can be detected substantially during the test pulse application period (e.g., 3 μsec). A timing corresponding to the application of the test pulse 121 is a derivative detection point 123 at which the current derivative value should be detected.

FIG. 13A shows a current derivative detection voltage obtained by applying the test pulse of the voltage vector V1 at different rotor electrical angles while detecting the rotor electrical angles by means of an encoder. FIG. 13B shows a current derivative detection voltage obtained by applying the test pulse of the voltage vector V3 in the same manner as described above, and FIG. 13C shows a current derivative detection voltage obtained by applying the test pulse of the voltage vector V5 in the same manner as described above. Immediately before the application of the offset pulse after the application of the test pulse, i.e., at the end of the application of the test pulse, A/D conversion is performed, and the current derivative detection voltage is fetched. FIGS. 13A, 13B and 13C respectively show the detection voltage of the U-phase current derivative diU, the detection voltage of the V-phase current derivative diV, and the detection voltage of the W-phase current derivative diW. An actual measurement voltage range is 0 to 5 V with a center value of 2.5 V corresponding to a current derivative value of 0.

For the test pulse of the voltage vector V1, as shown in FIG. 13A, the detection voltage of the U-phase current derivative diU periodically fluctuates around −1 V with respect to a center value of 2.5 V (around a measurement voltage of 1.5 V), and the detection voltage of the V-phase current derivative diV and the detection voltage of the W-phase current derivative diW periodically fluctuate around +0.5 V with respect to a center value of 2.5 V (around a measurement voltage of 3.0 V).

For the test pulse of the voltage vector V3, as shown in FIG. 13B, the detection voltage of the V-phase current derivative diV periodically fluctuates around −1 V with respect to a center value of 2.5 V (around a measurement voltage of 1.5 V), and the detection voltage of the U-phase current derivative diU and the detection voltage of the W-phase current derivative diW periodically fluctuate around +0.5 V with respect to a center value of 2.5 V (around a measurement voltage of 3.0 V).

For the test pulse of the voltage vector V5, as shown in FIG. 13C, the detection voltage of the W-phase current derivative diW periodically fluctuates around −1 V with respect to a center value of 2.5 V (around a measurement voltage of 1.5 V), and the detection voltage of the U-phase current derivative diU and the detection voltage of the V-phase current derivative diV periodically fluctuate around +0.5 V with respect to a center value of 2.5 V (around a measurement voltage of 3.0 V).

During the application of the voltage vector V1, V3, V5, one of the three phases is connected to the power supply voltage Vdc, and the other two phases are connected to 0 V (ground potential). The voltage application direction of the one phase is opposite to the voltage application directions of the other two phases. With the three phases, the total current is zero, and the total current derivative is also zero.

As shown in FIGS. 13A, 13B and 13C, three phase sinusoidal signals with a phase difference of 120 degrees between two cycles for each cycle of the rotor electrical angle though having a small amplitude can be obtained, so that the rotor position can be properly determined. In this specific example, the rotor position is updated in each PWM cycle (70 μsec), and the detection accuracy is about ±1 degree in mechanical angle. In this embodiment, therefore, a position servo control operation requiring accurate and highly-responsive position feedback control can be performed substantially without the saliency in the SPMSM in which the sensorless control is generally difficult in the lower motor rotation speed range.

In this embodiment, the three phase current derivative values are detected by using the three voltage vectors V1, V3, V5 as the test pulse. Alternatively, the three phase current derivative values may be detected by using only one voltage vector as the test pulse. Even in this case, the rotor position can be estimated.

In this embodiment, as described above, the motor control device 100 is provided, which controls the AC motor M by the sensorless control without the use of the rotor position detector. The motor control device 100 is capable of speedily and accurately detecting the current derivatives of the winding currents of the AC motor M. In addition, the motor control device 100 can achieve the current derivative detection with a smaller structure. Thus, the motor control device 100 is smaller in structure and yet is capable of accurately performing the motor control with a higher responsiveness.

In this embodiment, specifically, the current patterns 51, 52 formed as wiring patterns of the printed circuit board 40 (multilayer printed circuit board) are provided in the current line 9uvw connecting the inverter 2 to the winding 5uvw of the AC motor M. These current patterns 51, 52 are respectively provided in the inner printed wiring layers 45, 46 of the printed circuit board 40 and, therefore, are insulated from the major surfaces 41, 42 of the printed circuit board 40. The chip inductors L1, L2, L3, L4 are mounted on the major surfaces 41, 42 of the printed circuit board 40 in opposed relation to the current patterns 51, 52. The chip inductors L1, L2, L3, L4 are disposed with their coil directions each coinciding with the predetermined direction 53 crossing the current patterns 51, 52. That is, the chip inductors L1, L2, L3, L4 mounted on the major surfaces 41, 42 of the printed circuit board 40 are opposed to the current patterns 51, 52 formed in the inner printed wiring layers 45, 46 of the printed circuit board 40 with their coil directions crossing the current patterns 51, 52, and electrically insulated from the current patterns 51, 52 by the insulation material (insulative substrates) of the printed circuit board 40. Therefore, the magnetic flux generated by the current flowing through the current patterns 51, 52 interlinks with the coils of the chip inductors L1, L2, L3, L4.

When the current flowing through the current patterns 51, 52 is changed and the magnetic flux is correspondingly changed, the chip inductors L1, L2, L3, L4 generate electromotive forces such as to prevent the change in the magnetic flux, and a voltage correspondingly occurs between the opposite ends of each of the chip inductors L1, L2, L3, L4. The voltage can be regarded as a signal indicating a change in the current flowing through the current patterns 51, 52, i.e., as a signal indicating the current derivative value. Thus, the chip inductors L1, L2, L3, L4 function as a sensor that directly detects the current derivative. Therefore, the current derivative value can be speedily detected without the need for a complicated time-consuming computation process.

The chip inductors L1, L2, L3, L4 are mounted on the major surfaces 41, 42 of the printed circuit board 40, and are connected in series to form the series circuit 60. The midpoint 59 of the series circuit 60 is connected to the ground potential (reference potential), and the opposite ends of the series circuit 60 are connected to the pair of input terminals 70a, 70b of the differential amplification circuit 70. The pair of load resistors R1, R2 are connected between the midpoint 59 and the opposite ends of the series circuit 60.

The electromotive forces generated by the chip inductors L1, L2, L3, L4 cause the current flow in the load resistors R1, R2, whereby voltage drop occurs and the signals corresponding to the voltage drop are inputted to the differential amplification circuit 70. With the midpoint 59 of the series circuit 60 connected to the ground potential (reference potential), the potential of the midpoint 59 is not changed even if the potentials of the current patterns 51, 52 are significantly changed due to the switching in the inverter 2. This suppresses the influence of the switching, so that the signals can be stably inputted to the differential amplification circuit 70.

The differential amplification circuit 70 differentially amplifies the signals inputted to the pair of input terminals 70a, 70b thereof, so that an in-phase component is removed from the signals inputted to the pair of input terminals 70a, 70b and only an out-of-phase component is amplified. Since a noise component is the in-phase component, the differential amplification circuit 70 can amplify and output a noise-free signal component. Therefore, even if the current derivative signals to be outputted from the chip inductors L1, L2, L3, L4 are weak, the current derivative can be detected at a higher signal-to-noise ratio.

In this manner, the currents supplied from the inverter 2 to the AC motor M can be detected directly (and therefore speedily) by the chip inductors, and the signals indicating the current derivatives can be properly provided. Thus, the controller 1 can speedily and accurately estimate the rotor position of the AC motor M, thereby accurately performing the motor control operation with a higher responsiveness.

Further, the chip inductors, which are industrially manufactured, have little variations in performance, so that the adjustment of the individual chip inductors is not required. Since the chip inductors are smaller in size, the size of the structure for the detection of the current derivative can be advantageously reduced.

On the printed circuit board 40, not only the chip inductors L1, L2, L3, L4 but also some or all of the load resistors R1, R2, the differential amplification circuit 70, the inverter 2 and the controller 1 can be mounted. Thus, the overall size reduction of the motor control device 100 can be achieved. In other words, it is possible to provide the structure capable of directly and accurately detecting the current derivative value while suppressing or preventing the size increase of the motor control device 100.

The chip inductors L1, L2, L3, L4 are connected in series so that the electromotive forces are inducted in the same direction in the respective chip inductors L1, L2, L3, L4 by the change in the magnetic flux generated by the current flowing through the current patterns 51, 52. Thus, the sum of the electromotive forces generated by the respective chip inductors L1, L2, L3, L4 can be amplified by the differential amplification circuit 70 and, therefore, the signal indicating the current derivative can have a greater amplitude. Further, the current derivative value can be more accurately detected by averaging the characteristic variations of the individual chip inductors L1, L2, L3, L4.

In this embodiment, the number of the chip inductors L1, L2, L3, L4 are even (two in the first specific example, and four in the second specific example). Thus, the series circuit 60 including the chip inductors L1, L2, L3, L4 can be easily configured symmetrically with respect to the midpoint 59, making it easier to balance the inputs to the pair of input terminals 70a, 70b of the differential amplification circuit 70.

The controller 1 estimates the rotor position by regarding the outputs of the differential amplification circuits 70 as values corresponding to the time-differential values of the winding currents of the AC motor M (current derivative values). Specifically, the controller 1 determines the inductances of the respective phase windings based on the time-differential values of the winding currents (current derivative values). Since the inductances of the respective phase windings periodically change according to the rotor position, the controller 1 can estimate the rotor position based on the respective phase winding inductances.

In the embodiment described above, the chip inductors L1, L2, L3, L4 are mounted in the same number on the two opposite major surfaces 41, 42 of the printed circuit board 40. With the chip inductors L1, L2, L3, L4 mounted in the same number on the one major surface 41 and on the other major surface 42 of the printed circuit board 40, the series circuit 60 of the chip inductors L1, L2, L3, L4 can be easily configured symmetrically with respect to the midpoint 59, thereby making it easier to balance the inputs to the pair of input terminals 70a, 70b of the differential amplification circuit 70.

Further, the chip inductors L1, L2, L3, L4 can be dividedly mounted on the one major surface 41 and on the other major surface 42 of the printed circuit board 40 to be thereby three-dimensionally disposed on the printed circuit board 40. This makes it possible to further reduce the size of the motor control device 100.

The magnetic flux generated by the current flowing through the current patterns 51, 52 is directed in opposite directions as observed on the one major surface 41 and on the other major surface 42 of the printed circuit board 40. On the other hand, magnetic flux externally generated, i.e., magnetic flux not attributable to the current flowing through the current patterns 51, 52, is directed in the same direction and has the same magnitude on the one major surface 41 and on the other major surface 42 of the printed circuit board 40. As described above, the chip inductors L1, L2, L3, L4 are connected in series so that the electromotive forces induced in the respective chip inductors L1, L2, L3, L4 by the change in the magnetic flux generated by the current flowing through the current patterns 51, 52 are directed in the same direction. In this case, the voltage occurring between the opposite ends of the series circuit 60 of the chip inductors L1, L2, L3, L4 has a value such that the electromotive forces generated in the respective chip inductors L1, L2, L3, L4 according to the change in the current flowing through the current patterns 51, 52 are superposed together and the electromotive force attributable to the external magnetic flux is offset. This makes it possible to detect the current derivative while suppressing or preventing the influence of the external magnetic flux.

In the first specific example, the chip inductors L1, L2 includes the single chip inductor mounted on the one major surface 41 of the printed circuit board 40 and the single chip inductor mounted on the other major surface 42. The single chip inductor L1 mounted on the one major surface 41 and the single chip inductor L2 mounted on the other major surface 42 are geometrically symmetric with respect to the current patterns 51, 52 through which the winding current flows. In other words, the current derivative detector 4uvw is designed so that the current patterns 51, 52 through which the winding current flows are spaced the same distances from the single chip inductor L1 mounted on the one major surface 41 and from the single chip inductor L2 mounted on the other major surface 42. This makes it easier to balance the inputs to the pair of input terminals 70b of the differential amplification circuit 70.

In the second specific example, the chip inductors L1, L2, L3, L4 include the two chip inductors mounted on the one major surface 41 of the printed circuit board 40, and the two chip inductors mounted on the other major surface 42. The total of four chip inductors L1, L2, L3, L4 are connected in series so that the chip inductor L1 on the one major surface 41 of the printed circuit board 40 and the chip inductor L2 on the other major surface 42 are connected in series to be arranged (connected) on one of the opposite sides of the midpoint 59 and the other two chip inductors L3, L4 are connected in series to be arranged (connected) on the other side of the midpoint 59. Thus, the geometrical arrangements of the chip inductors with respect to the current pattern 52 through which the winding current flows (more specifically, the distances from the current pattern 52 to the chip inductors L1, L2, L3, L4) on the opposite sides of the midpoint 59 of the series circuit are equivalent to each other (symmetrical). This connection configuration (arrangement) is particularly effective where the geometrical arrangement of the chip inductors L1, L4 mounted on the one major surface 41 and the geometrical arrangement of the chip inductors L2, L3 mounted on the other major surface 42 with respect to the current pattern 52 (more specifically, the distances from the current pattern 52 to the chip inductors L1, L4; L2, L3 on the opposite major surfaces) are not equivalent to each other (symmetrical).

In the embodiment described above, the chip inductors L1, L2, L3, L4 are air-core coils, and are not shielded. The use of the chip inductors of the air-core coil type makes it possible to detect the current derivative without the influence of the magnetic saturation. Further, the use of the chip inductors of the unshielded structure makes it possible to detect the magnetic flux generated by the current flowing through the wiring pattern at a higher sensitivity.

In the embodiment described above, the chip inductors L1, L2, L3, L4 have the same specifications. The use of the chip inductors of the same specifications makes it easier to configure the series circuit 60 symmetrically with respect to the midpoint 59. Chip inductors industrially manufactured as having the same specifications are uniform in performance and, therefore, can be used substantially without the need for the adjustment.

While the embodiment of the present invention has thus be described, the invention may be embodied in some other ways, and various design modifications may be made within the scope of the present invention defined by the appended claims.

In the embodiment describe above, for example, the first specific example employs the two chip inductors L1, L2, and the second specific example employs the four chip inductors L1, L2, L3, L4 for the current derivative detectors 4uvw. However, the number of the chip inductors for the detection of the current derivative is not limited to those described above. As described above, the number of the chip inductors is preferably even. Further, the even-numbered chip inductors are preferably mounted in the same number on the opposite major surfaces 41, 42 of the printed circuit board 40.

In the embodiment described above, the chip inductors mounted in pair on the opposite major surfaces of the printed circuit board 40 are opposed to each other by way of example. However, the chip inductors are merely required to be opposed to the current patterns 51, 52, and the chip inductors provided on the opposite major surfaces 41, 42 of the printed circuit board 40 may be offset from each other as seen perpendicularly to the major surfaces 41, 42.

In the embodiment described above, the current patterns 51, 52 are respectively provided in the two inner printed wiring layers 45, 46 of the printed circuit board 40 in the first specific example, and the single current pattern 52 is provided in the single inner printed wiring layer 46 of the printed circuit board 40 in the second specific example. Alternatively, the multilayer printed circuit board may include a greater number of printed wiring layers, and three or more current patterns may be respectively provided in three or more inner printed wiring layers of the multilayer printed circuit board. The current patters are not necessarily required to each have a linear band shape, but may be each shaped to include a curved portion and/or a bent portion.

REFERENCE SIGNS LIST

1: Controller
2: Inverter
3u, 3v, 3w: Current detectors
4u, 4v, 4w: Current derivative detectors
5v, 5w: Windings
9u, 9v, 9w: Current lines
11: Position controller
12: Speed controller
13: Current controller
14: PWM generator
15: Position estimator
16: Speed estimator
40: Printed circuit board
41, 42: Major surfaces
43, 44: Outer printed wiring layers
46: Inner printed wiring layers
47, 48, 49: Insulation layers
51, 52: Current patterns
53: Predetermined direction
60: Series circuit
70: Differential amplification circuit
70b: Input terminals
100: Motor control device
121: Test pulse
122: Offset pulse
L1 to L4: Chip inductors
M: AC motor
R1, R11, R12: Load resistors
R2, R21, R22: Load resistors

The invention claimed is:

1. A motor control device that controls an AC motor by sensorless control without the use of a rotor position detector, the motor control device comprising:
an inverter that converts a direct current to an alternating current based on a pulse width modulation signal;
a multilayer printed circuit board including an inner layer having a wiring pattern provided in a current line connecting the inverter to a winding of the AC motor;
a plurality of chip inductors mounted on a major surface of the multilayer printed circuit board in opposed relation to the wiring pattern with their coil directions coinciding with a predetermined direction crossing the wiring pattern, and connected in series to form a series circuit having a midpoint connected to a reference potential;
load resistors respectively connected between the midpoint of the series circuit and opposite ends of the series circuit;

a differential amplification circuit having a pair of input terminals respectively connected to the opposite ends of the series circuit; and a control unit that estimates a position of a rotor of the AC motor by using an output of the differential amplification circuit, and generates a pulse width modulation signal to be supplied to the inverter according to the estimated rotor position.

2. The motor control device according to claim 1, wherein the chip inductors are connected in series so that electromotive forces are induced in the same direction in the respective chip inductors by a change in magnetic flux generated by a current flowing through the wiring pattern.

3. The motor control device according to claim 1, wherein the chip inductors are provided in an even number.

4. The motor control device according to claim 1, wherein the control unit is configured to estimate the rotor position by regarding the output of the differential amplification circuit as a value corresponding to a time-differential value of a winding current of the AC motor.

5. The motor control device according to claim 1, wherein the chip inductors are mounted in the same number on two opposite major surfaces of the multilayer printed circuit board.

6. The motor control device according to claim 1, wherein the chip inductors include a single chip inductor mounted on one of the opposite major surfaces of the multilayer printed circuit board and a single chip inductor mounted on the other major surface.

7. The motor control device according to claim 6, wherein a distance from the wiring pattern to the single chip inductor mounted on the one major surface of the multilayer printed circuit board is equal to a distance from the wiring pattern to the single chip inductor mounted on the other major surface.

8. The motor control device according to claim 1, wherein the chip inductors include two chip inductors mounted on one of the opposite major surfaces of the multilayer printed circuit board, and two chip inductors mounted on the other major surface.

9. The motor control device according to claim 8, wherein the series circuit is configured by four chip inductors so that one of the chip inductors mounted on the one major surface of the multilayer printed circuit board and one of the chip inductors mounted on the other major surface are connected in series to be disposed on one of opposite sides of the midpoint and the other two chip inductors are connected in series to be disposed on the other side of the midpoint.

10. The motor control device according to claim 1, wherein the chip inductors are air-core coils, and are not shielded.

11. The motor control device according to claim 1, wherein the chip inductors have the same specifications.

* * * * *